(12) United States Patent
Tachi et al.

(10) Patent No.: US 11,290,619 B2
(45) Date of Patent: Mar. 29, 2022

(54) IMAGING CONTROL APPARATUS, IMAGING CONTROL METHOD, AND IMAGING APPARATUS

(71) Applicant: Sony Corporation, Tokyo (JP)

(72) Inventors: Masayuki Tachi, Kanagawa (JP); Hiroaki Yamajo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/083,007

(22) PCT Filed: Jan. 17, 2017

(86) PCT No.: PCT/JP2017/001384
§ 371 (c)(1),
(2) Date: Sep. 7, 2018

(87) PCT Pub. No.: WO2017/159027
PCT Pub. Date: Sep. 21, 2017

(65) Prior Publication Data
US 2019/0098180 A1    Mar. 28, 2019

(30) Foreign Application Priority Data
Mar. 17, 2016    (JP) .............................. JP2016-053995

(51) Int. Cl.
*H04N 5/225* (2006.01)
*H04N 5/04* (2006.01)
(Continued)

(52) U.S. Cl.
CPC ............. *H04N 5/04* (2013.01); *H04N 5/2258* (2013.01); *H04N 5/2353* (2013.01);
(Continued)

(58) Field of Classification Search
CPC .................................................. H04N 5/3692
See application file for complete search history.

(56) References Cited

U.S. PATENT DOCUMENTS

2006/0175549 A1* 8/2006 Miller ............... G08B 13/19643
250/334
2008/0218611 A1* 9/2008 Parulski ............... H04N 5/2258
348/262
(Continued)

FOREIGN PATENT DOCUMENTS

CN    103109524 A    5/2013
CN    104969238 A    10/2015
(Continued)

OTHER PUBLICATIONS

International Search Report and English translation thereof dated Apr. 11, 2017 in connection with International Application No. PCT/JP2017/001384.
(Continued)

*Primary Examiner* — Jason A Flohre
*Assistant Examiner* — Dwight Alex C Tejano
(74) *Attorney, Agent, or Firm* — Wolf, Greenfield & Sacks, P.C.

(57) ABSTRACT

An imaging control apparatus according to the present disclosure includes an imaging controller that synchronizes an exposure timing of a first imaging device that performs exposure by a rolling shutter system and an exposure timing of a second imaging device that performs exposure by a rolling shutter system with imaging conditions different from imaging conditions of the first imaging device, on a basis of the imaging conditions.

11 Claims, 21 Drawing Sheets

(51) Int. Cl.
   H04N 5/232     (2006.01)
   H04N 5/353     (2011.01)
   H04N 9/04      (2006.01)
   H04N 5/235     (2006.01)
   H04N 5/247     (2006.01)
   H04N 5/262     (2006.01)
   H04N 5/265     (2006.01)
(52) U.S. Cl.
   CPC ......... *H04N 5/23296* (2013.01); *H04N 5/247* (2013.01); *H04N 5/2628* (2013.01); *H04N 5/3532* (2013.01); *H04N 9/04515* (2018.08); *H04N 5/265* (2013.01)

(56) References Cited

U.S. PATENT DOCUMENTS

| | | | | |
|---|---|---|---|---|
| 2012/0074227 | A1* | 3/2012 | Ferren | G02B 13/0065 235/462.21 |
| 2012/0075489 | A1* | 3/2012 | Nishihara | H04N 5/23296 348/222.1 |
| 2013/0242141 | A1* | 9/2013 | Ohki | G06T 3/40 348/239 |
| 2014/0198184 | A1* | 7/2014 | Stein | G06K 9/00791 348/47 |
| 2015/0085174 | A1* | 3/2015 | Shabtay | H04N 5/23296 348/336 |
| 2016/0050374 | A1* | 2/2016 | Shabtay | H04N 5/225 348/240.3 |

FOREIGN PATENT DOCUMENTS

| | | |
|---|---|---|
| CN | 105308947 A | 2/2016 |
| JP | 2003-134375 A | 5/2003 |
| JP | 2005-175970 A | 6/2005 |
| JP | 2012-227773 A | 11/2012 |
| WO | WO 2014/111814 A2 | 7/2014 |

OTHER PUBLICATIONS

International Written Opinion dated Apr. 11, 2017 in connection with International Application No. PCT/JP2017/001384, and English translation thereof.

International Preliminary Report on Patentability dated Sep. 27, 2018 in connection with International Application No. PCT/JP2017/001384, and English translation thereof.

Chinese Office Action dated Apr. 1, 2020 in connection with Chinese Application No. 201780016425.3, and English translation thereof.

* cited by examiner

[ FIG. 1 ]
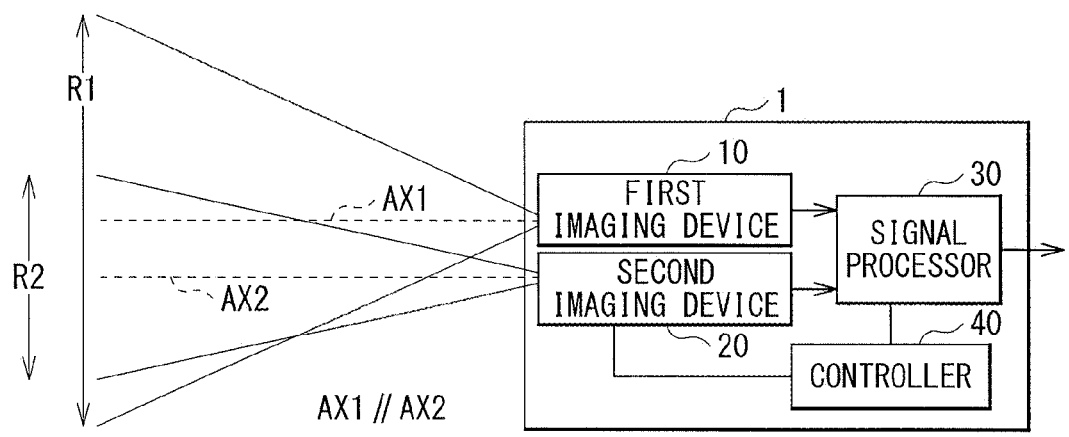
[ FIG. 2 ]
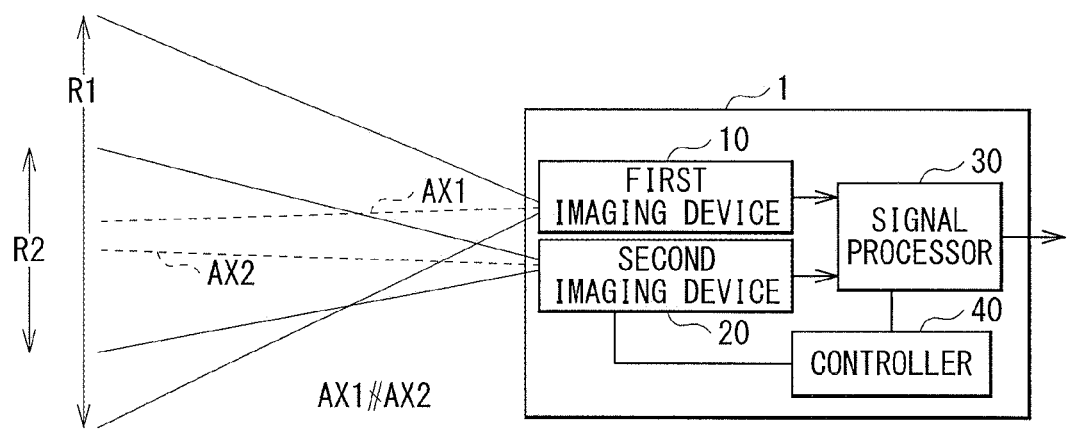

[ FIG. 3 ]
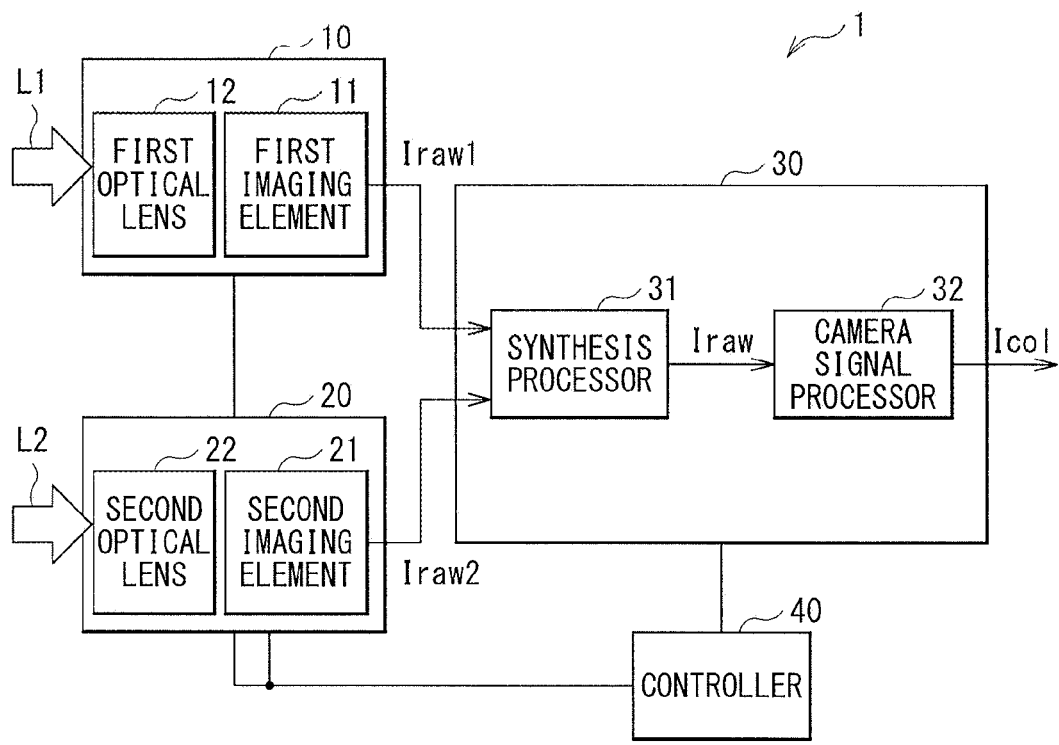
[ FIG. 4 ]
BAYER ARRAY
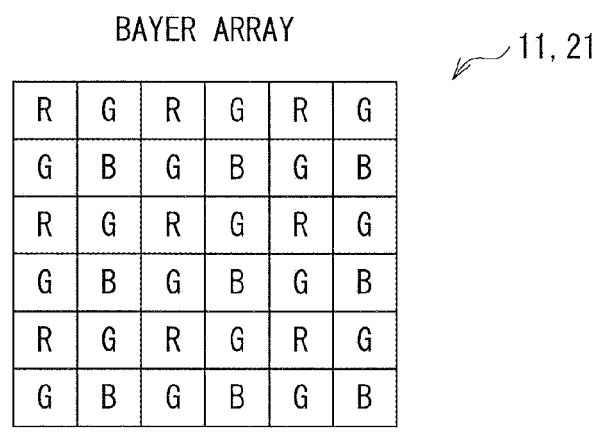

[FIG. 5]
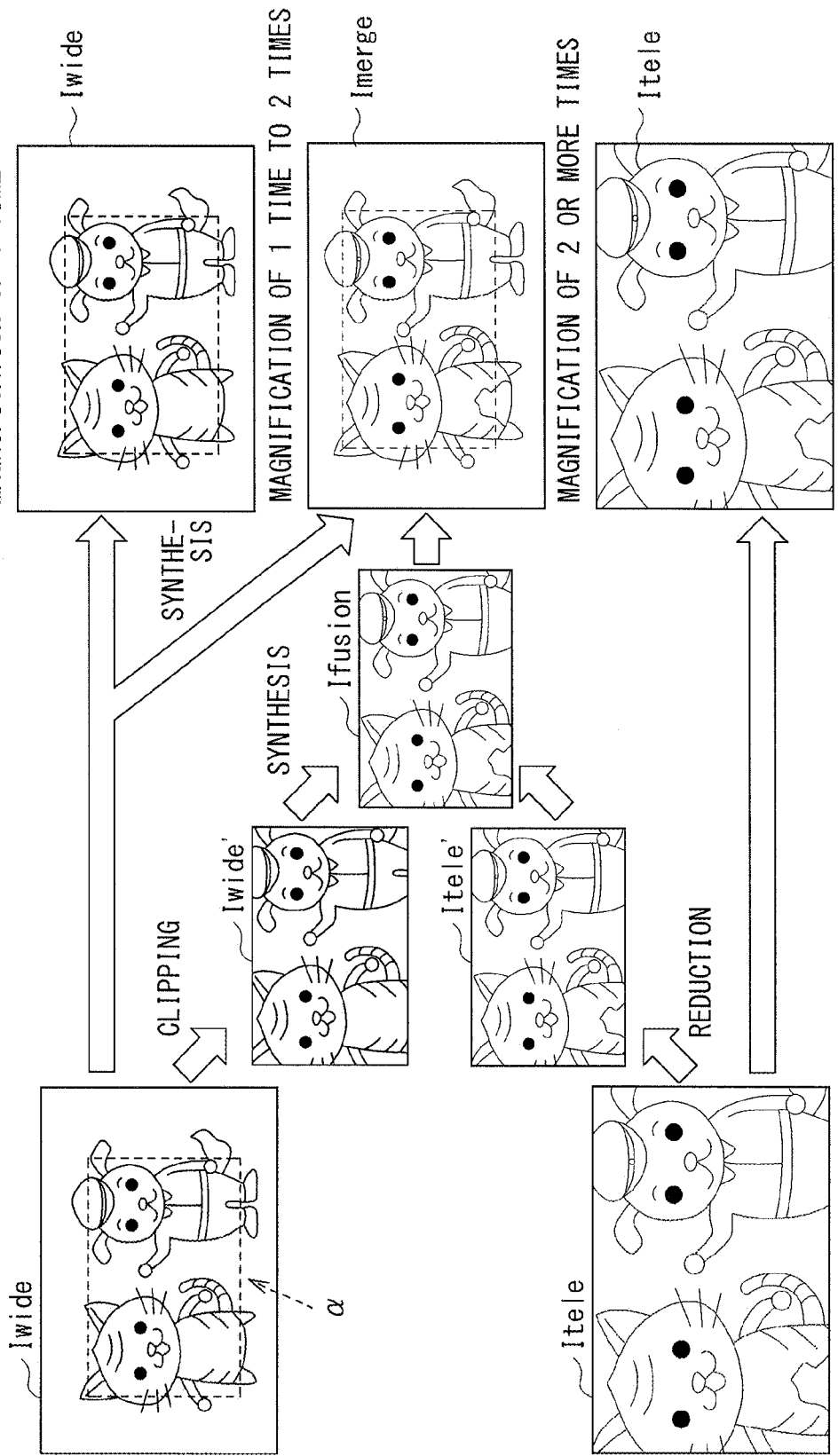

[FIG. 6]
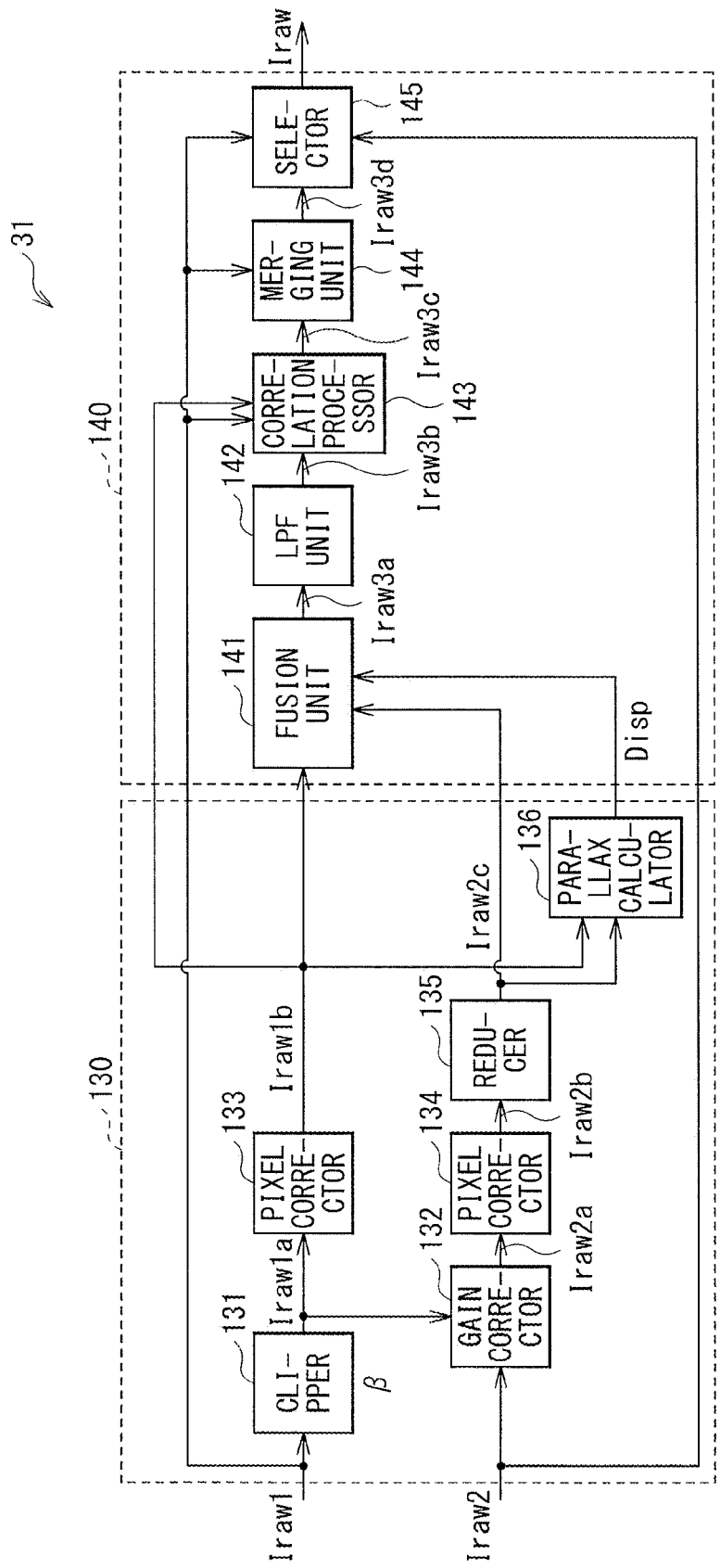

[ FIG. 7 ]
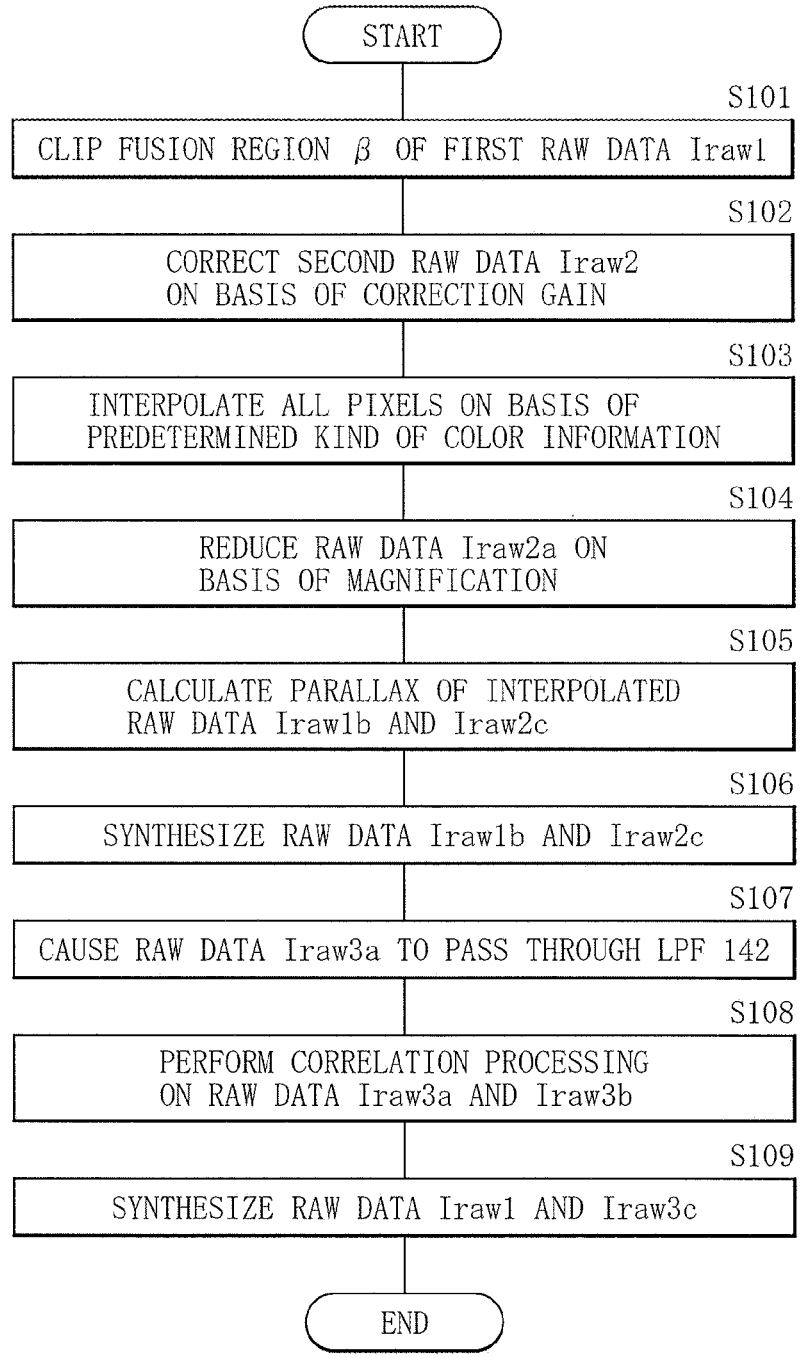

[ FIG. 8 ]
BAYER ARRAY                    G PIXEL INTERPOLATION
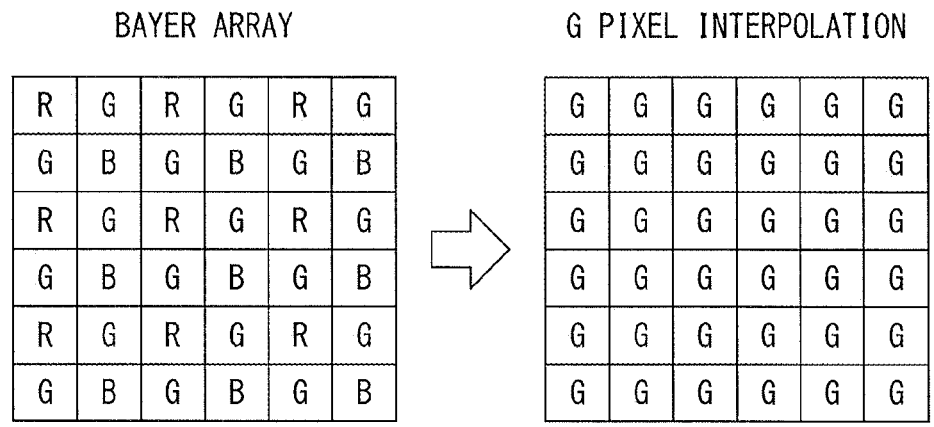
[ FIG. 9 ]
INTERPOLATION FILTER F IN CASE
WHERE CENTER PIXEL IS G PIXEL
| 0 | 0 | 0 |
|---|---|---|
| 0 | 1 | 0 |
| 0 | 0 | 0 |
[ FIG. 10 ]
INTERPOLATION FILTER F IN CASE WHERE
CENTER PIXEL IS R PIXEL OR B PIXEL
| 0 | 1 | 0 |
|---|---|---|
| 1 | 0 | 1 |
| 0 | 1 | 0 |

[ FIG. 11 ]

|  | | G INTERPOLATED DATA | | COLOR DIFFERENCE COMPONENT |
|---|---|---|---|---|
| Iraw3c | = | Iraw3b | + | Iraw1 − Iraw1b |
| Rraw3c | = | Graw3b | + | Rraw1 − Graw1b |
| Graw3c | = | Graw3b | + | Graw1 − Graw1b |
| Braw3c | = | Graw3b | + | Braw1 − Graw1b |

[ FIG. 12 ]

|  | | G INTERPOLATED DATA | | COLOR DIFFERENCE COMPONENT |
|---|---|---|---|---|
| Iraw3c | = | Iraw3b | × | Iraw1 ∕ Iraw1b |
| Rraw3c | = | Graw3b | × | Rraw1 ∕ Graw1b |
| Graw3c | = | Graw3b | × | Graw1 ∕ Graw1b |
| Braw3c | = | Graw3b | × | Braw1 ∕ Graw1b |

[ FIG. 13 ]
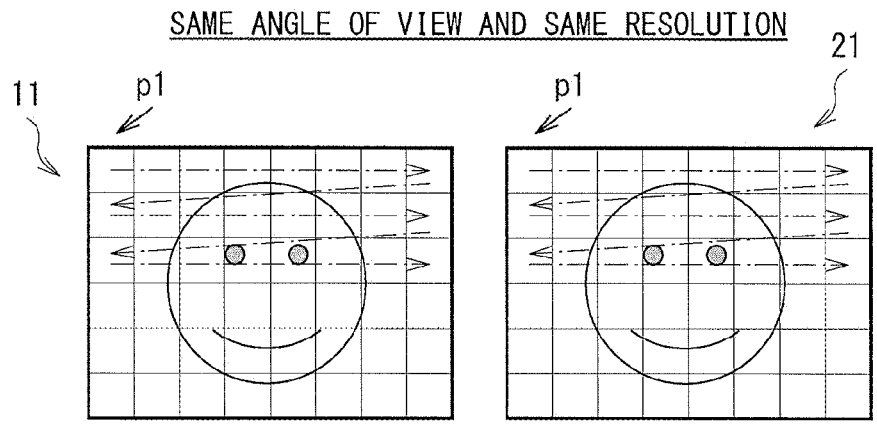
[ FIG. 14 ]
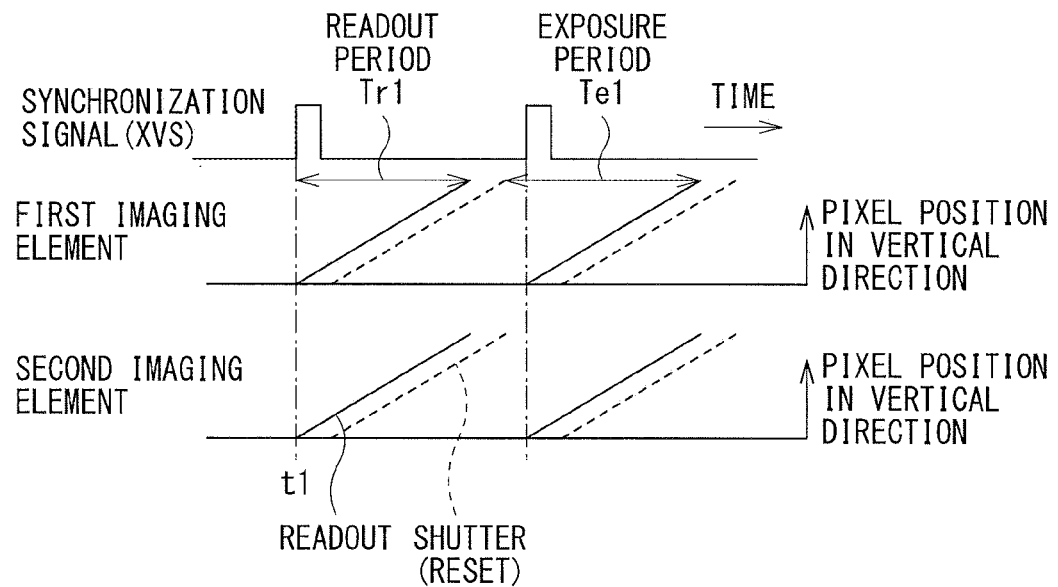

[ FIG. 15 ]
DIFFERENT ANGLE OF VIEW AND SAME RESOLUTION
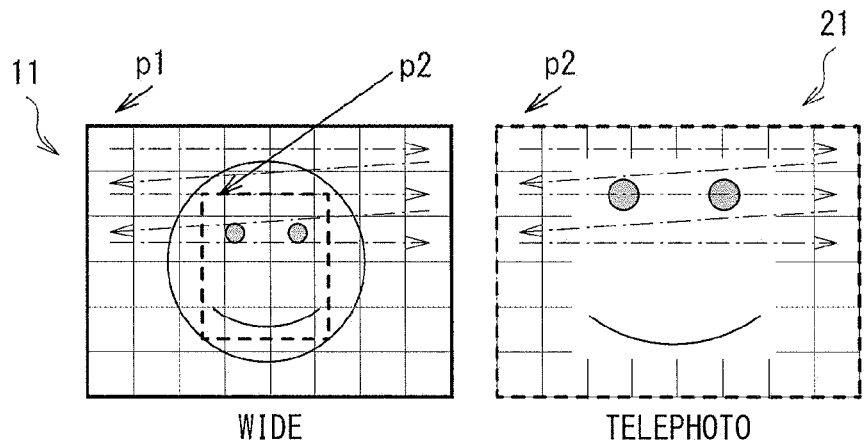
[ FIG. 16 ]
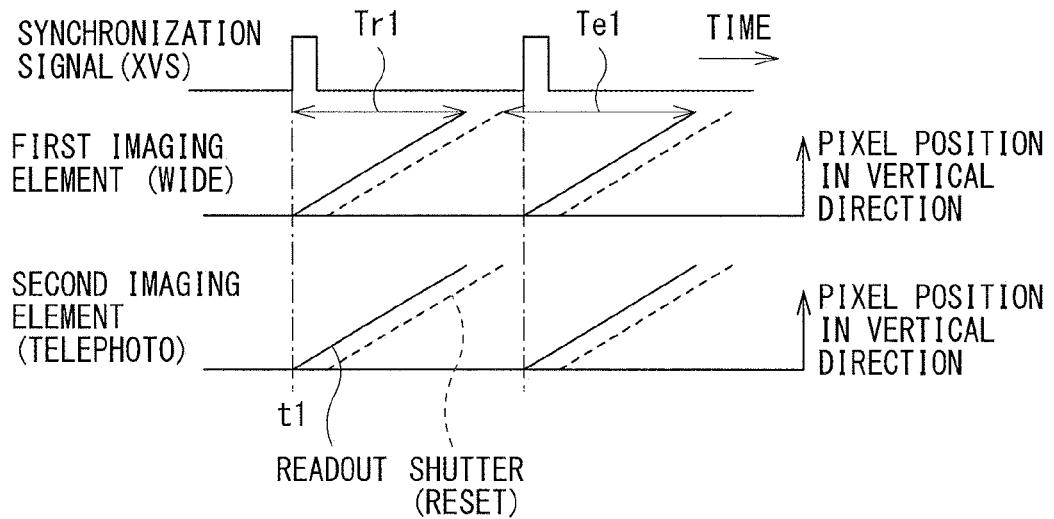

[ FIG. 17 ]
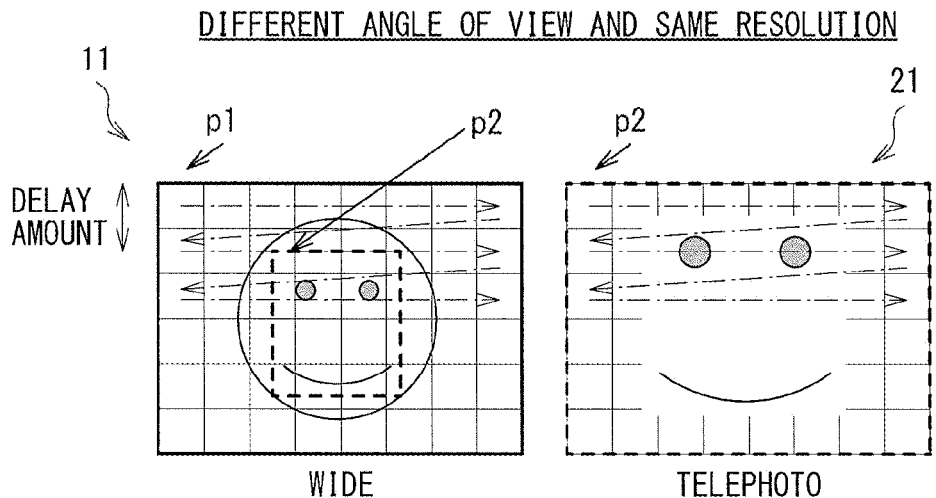
[ FIG. 18 ]
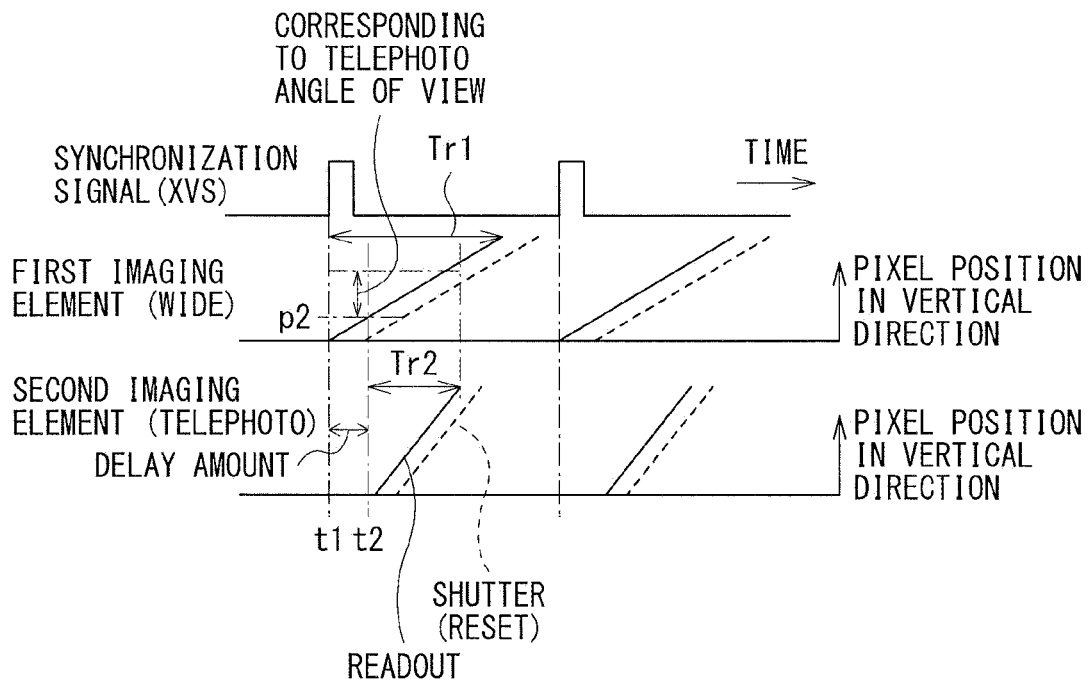

[ FIG. 19 ]
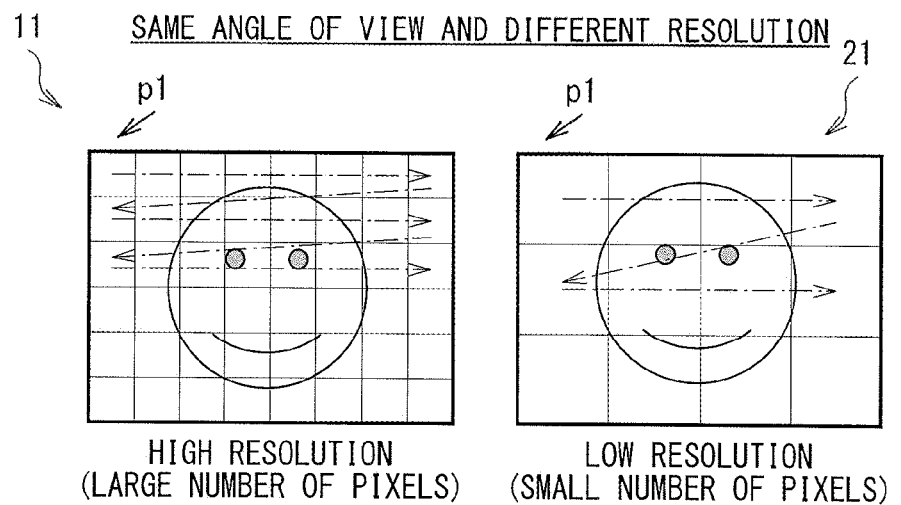
[ FIG. 20 ]
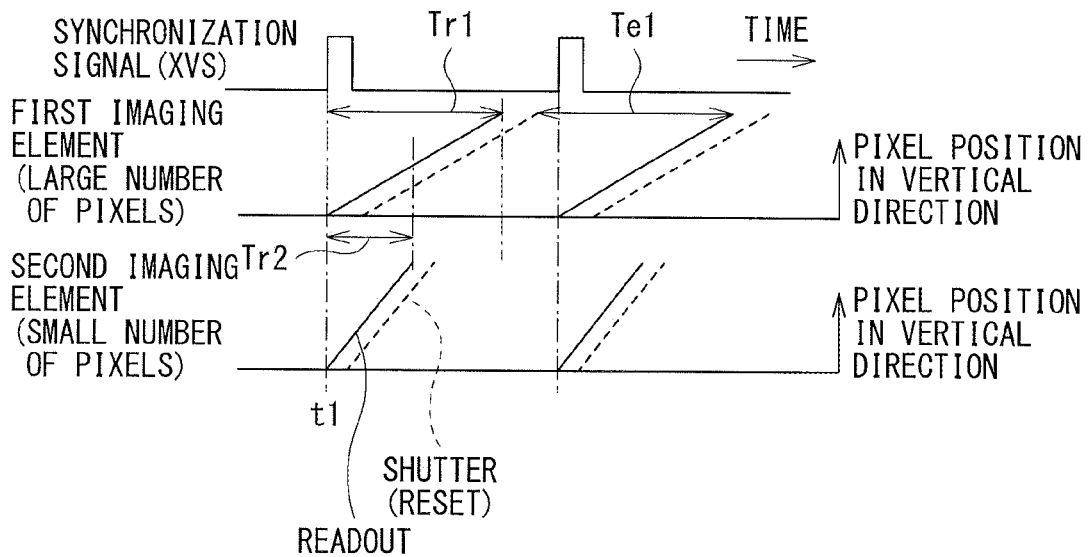

[FIG. 21]
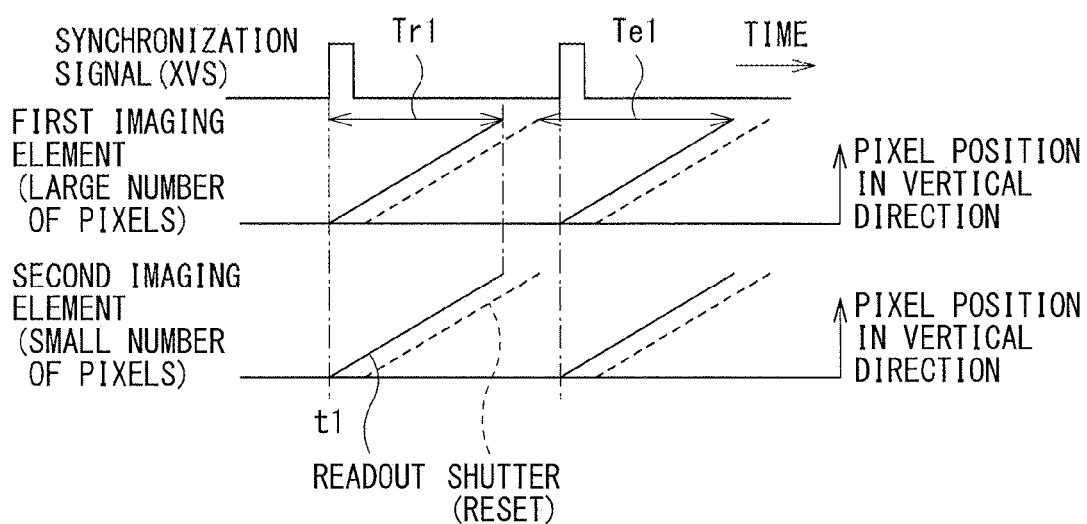

[ FIG. 22 ]
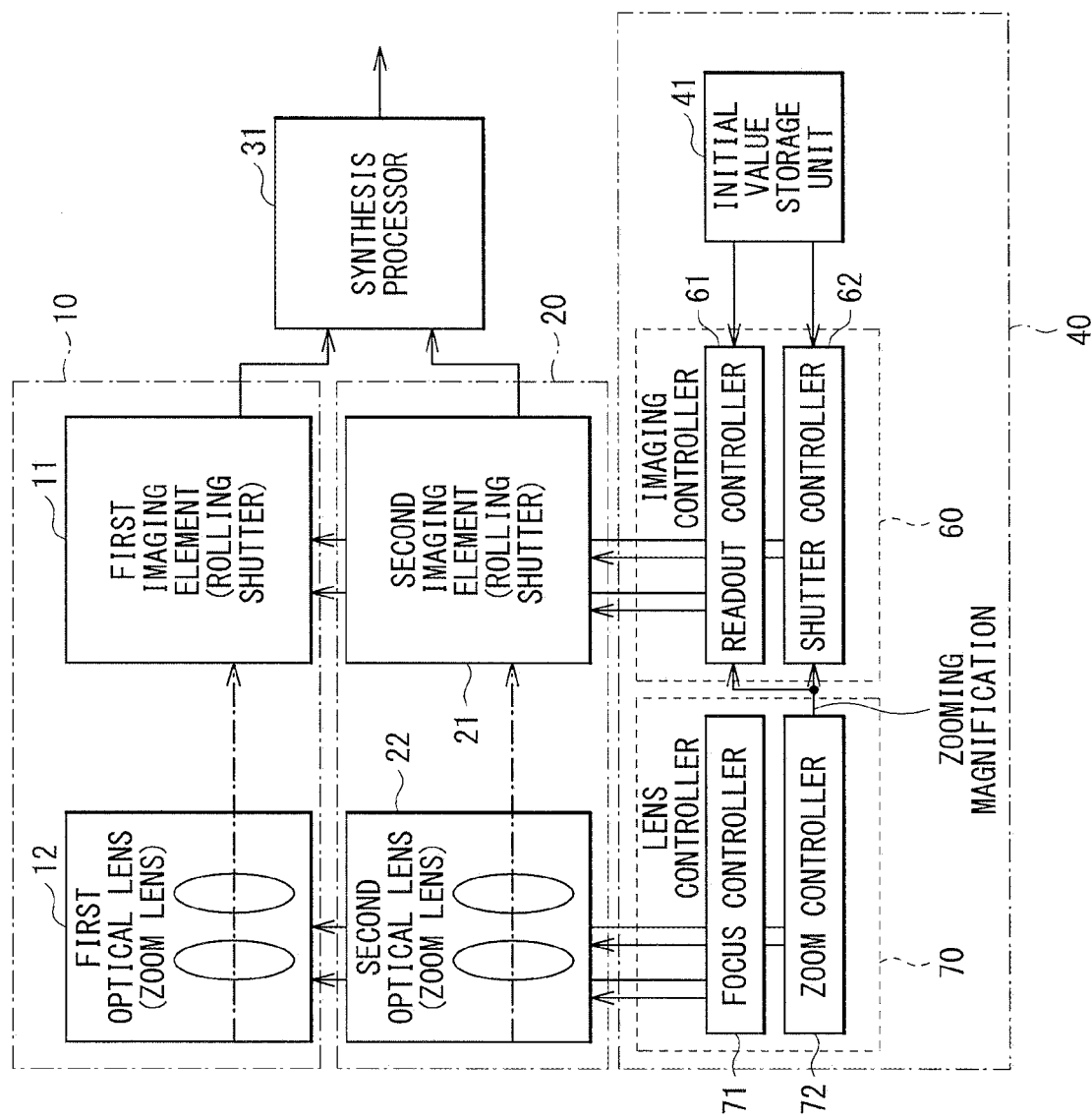

[FIG. 23]
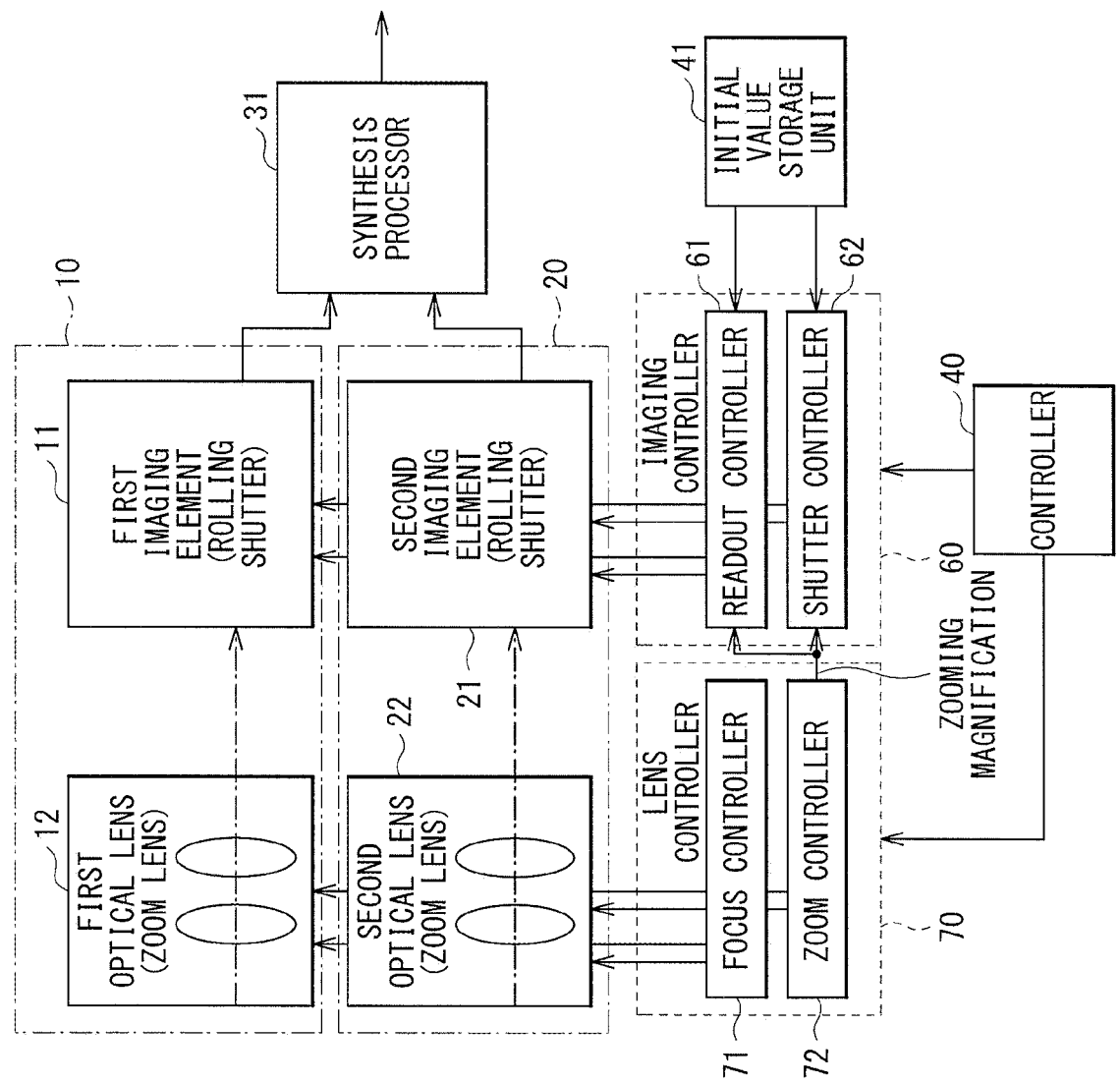

[FIG. 24]
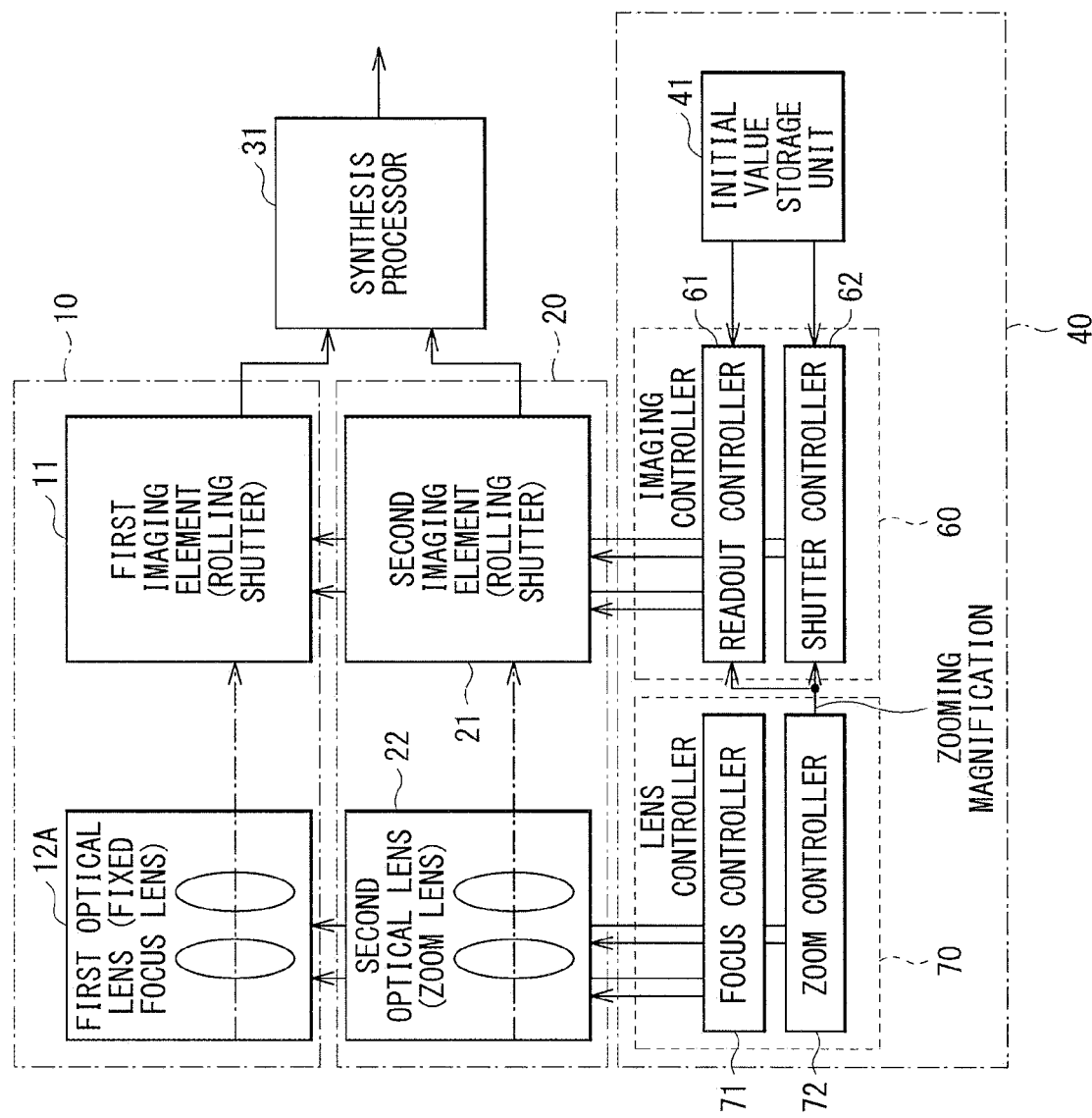

[ FIG. 25 ]
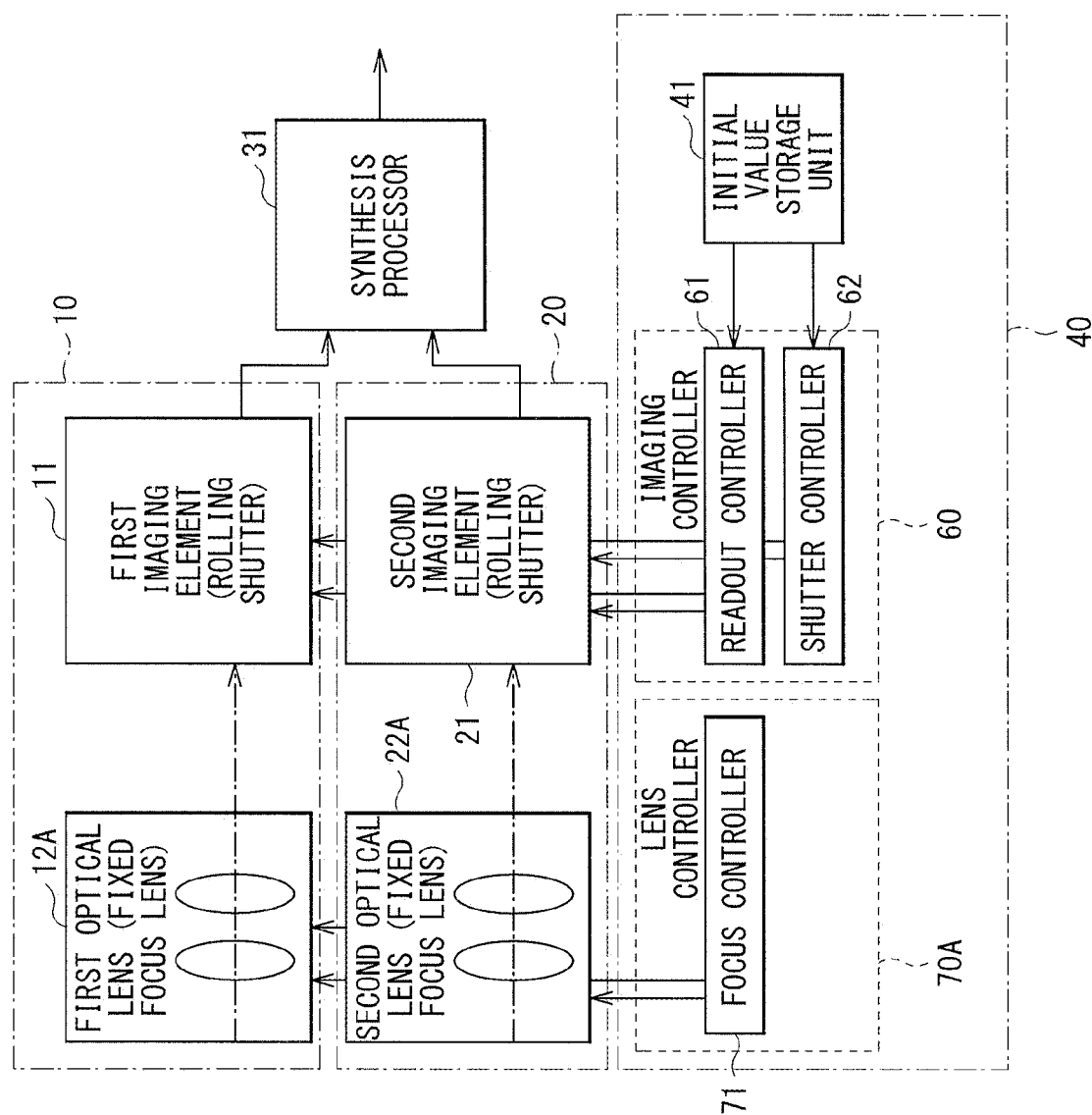

[ FIG. 26 ]
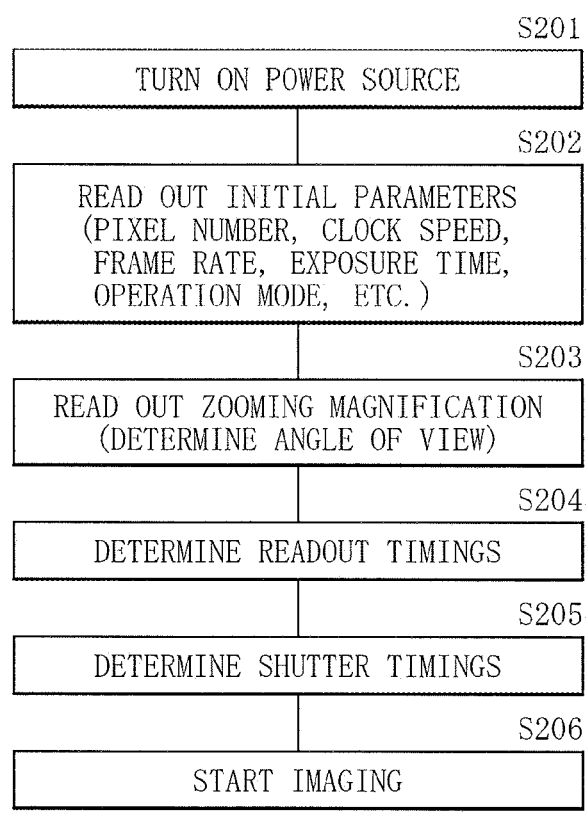

[FIG. 27]
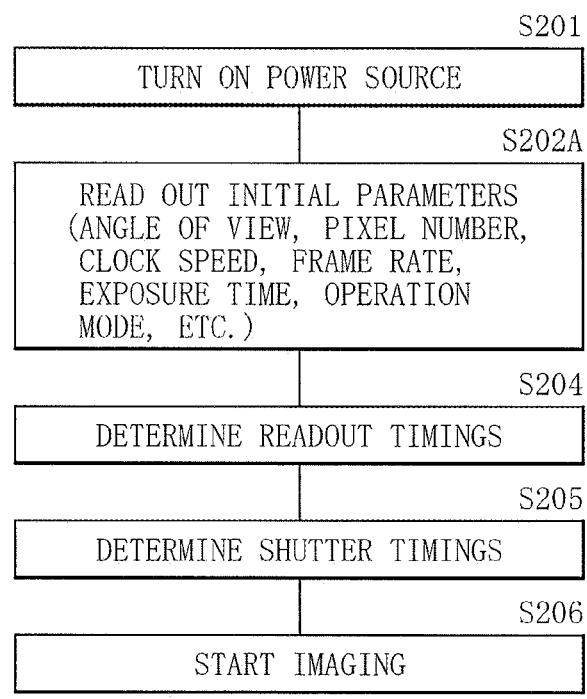

[ FIG. 28 ]
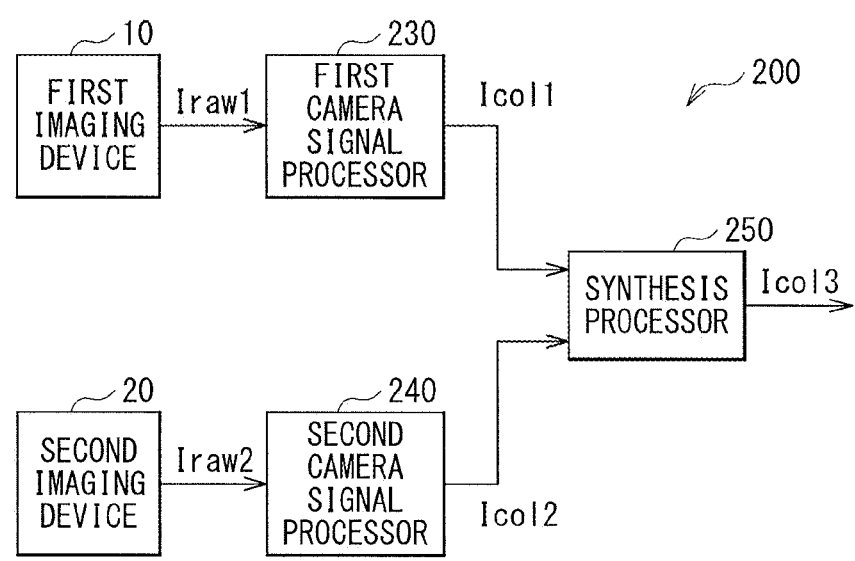

[ FIG. 29 ]
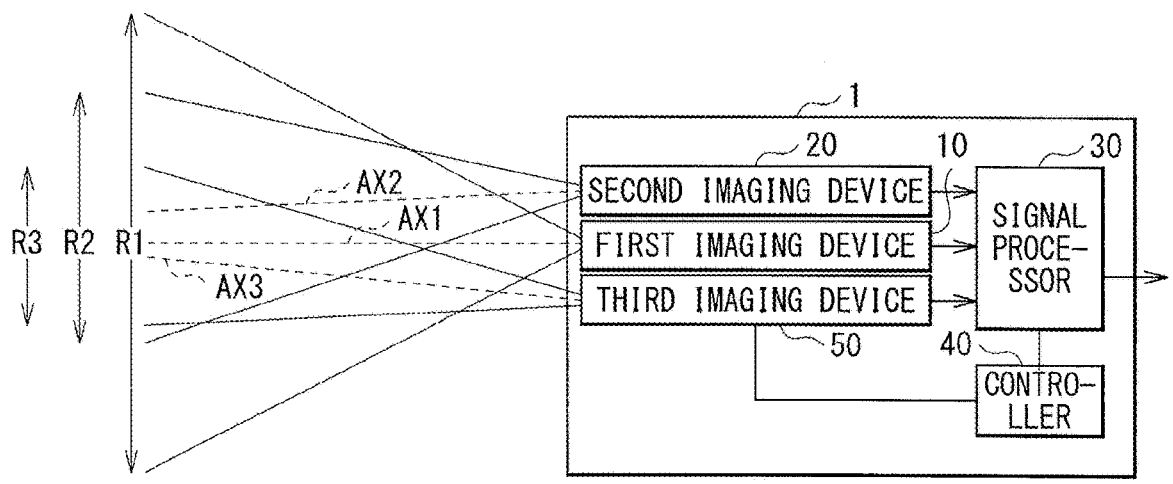
[ FIG. 30 ]
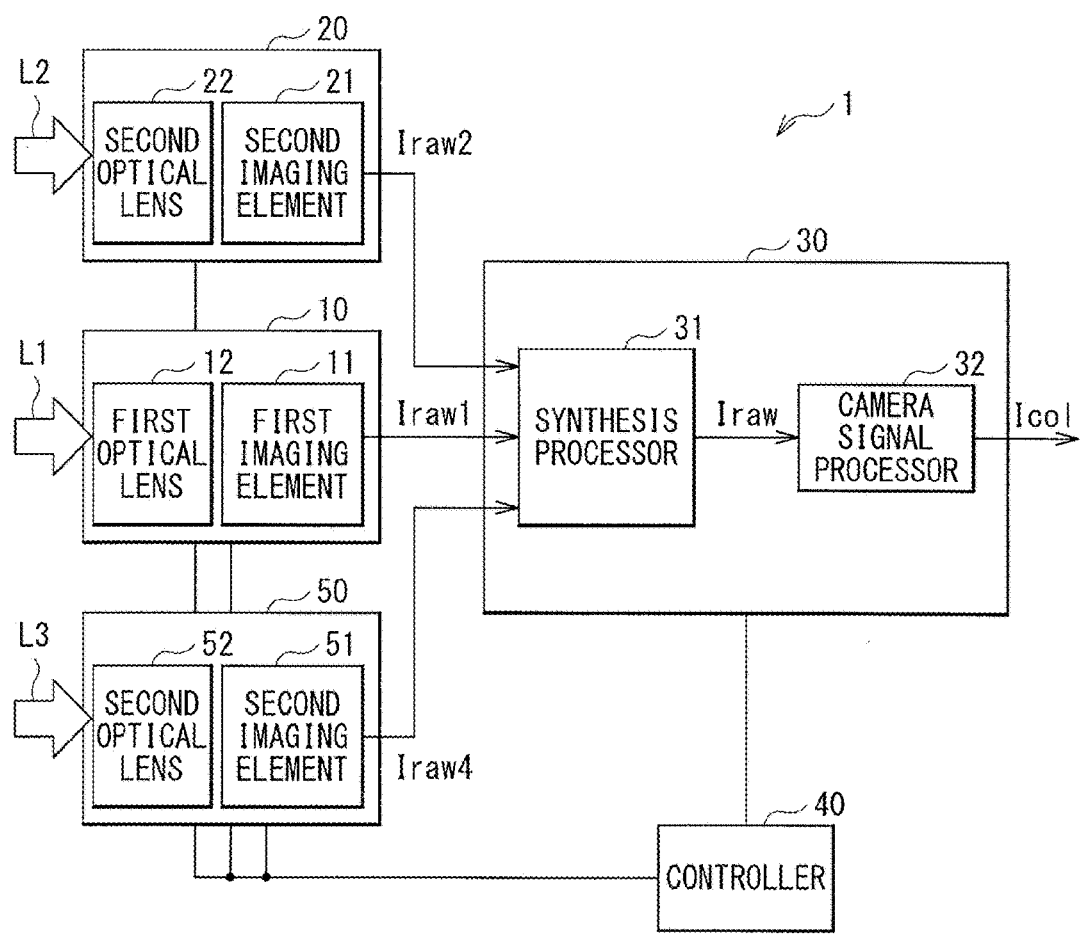

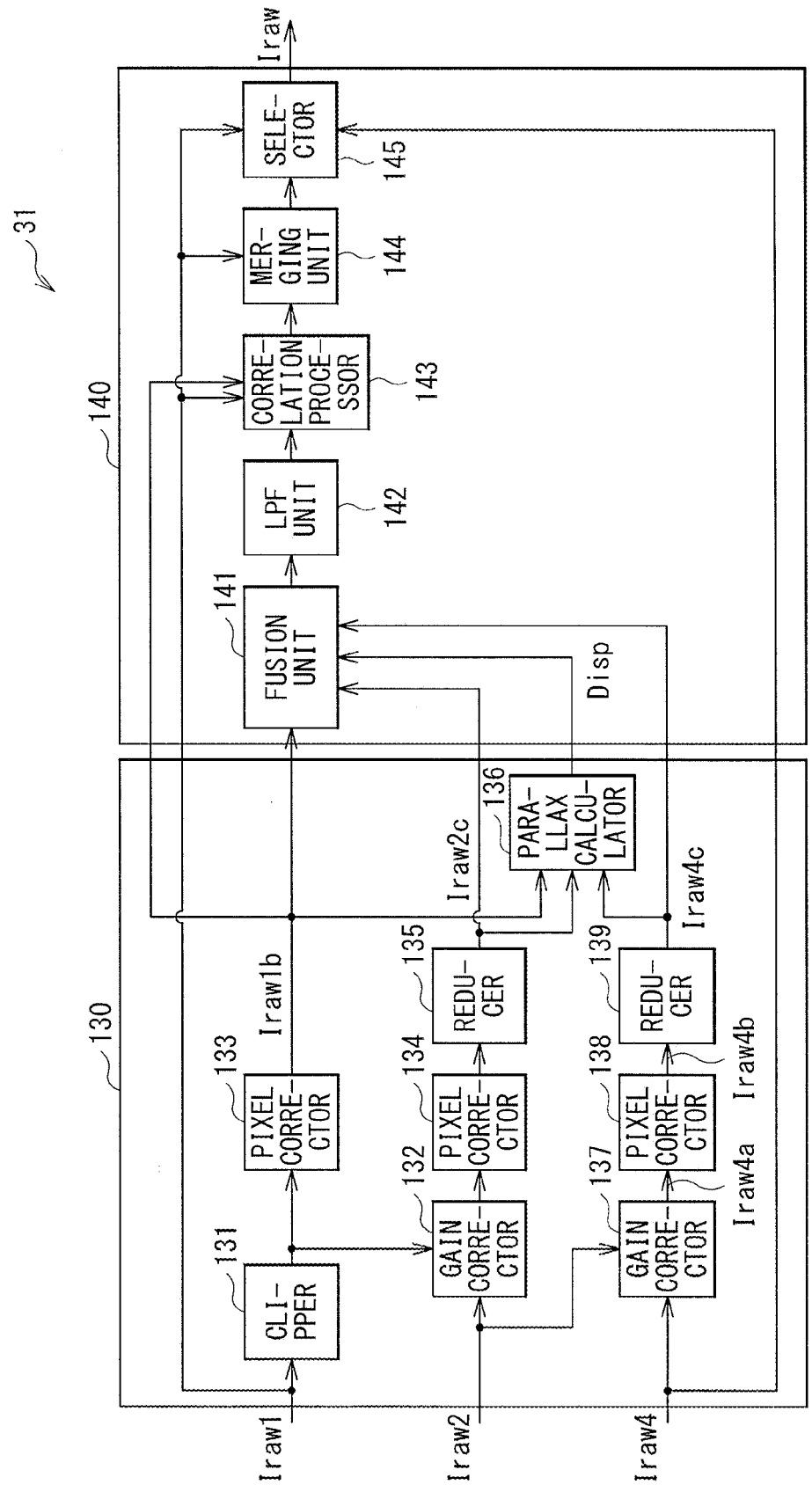
[ FIG. 31 ]

IMAGING CONTROL APPARATUS, IMAGING CONTROL METHOD, AND IMAGING APPARATUS

CROSS-REFERENCE TO RELATED APPLICATIONS

This application claims the benefit under 35 U.S.C. § 371 as a U.S. National Stage Entry of International Application No. PCT/JP2017/001384, filed in the Japanese Patent Office as a Receiving Office on Jan. 17, 2017, which claims priority to Japanese Patent Application Number JP2016-053995, filed in the Japanese Patent Office on Mar. 17, 2016, each of which is hereby incorporated by reference in its entirety.

TECHNICAL FIELD

The present disclosure relates to an imaging control apparatus, an imaging control method, and an imaging apparatus that are related to control of a plurality of imaging devices.

BACKGROUND ART

An imaging system that uses two imaging apparatuses to take an image having a wide visual field and a high resolution has been proposed (e.g., see PTL 1).

CITATION LIST

Patent Literature

PTL 1: Japanese Unexamined Patent Application Publication No. 2003-134375

SUMMARY OF THE INVENTION

In a case where imaging with use of a plurality of imaging devices is performed, it is desirable to appropriately control exposure timings in the respective imaging devices.

It is desirable to provide an imaging control apparatus, an imaging control method, and an imaging apparatus that allow a plurality of imaging devices to perform imaging on a same object at a substantially same exposure timing.

An imaging control apparatus according to an embodiment of the present disclosure includes: an imaging controller that synchronizes an exposure timing of a first imaging device that performs exposure by a rolling shutter system and an exposure timing of a second imaging device that performs exposure by a rolling shutter system with imaging conditions different from imaging conditions of the first imaging device, on the basis of the imaging conditions.

An imaging control method according to an embodiment of the present disclosure includes: performing synchronization control on an exposure timing of a first imaging device that performs exposure by a rolling shutter system and an exposure timing of a second imaging device that performs exposure by the rolling shutter system with imaging conditions different from imaging conditions of the first imaging device, on the basis of the imaging conditions.

An imaging apparatus according to an embodiment of the present disclosure includes: a first imaging device that performs exposure by a rolling shutter system; a second imaging device that performs exposure by the rolling shutter system with imaging conditions different from imaging conditions of the first imaging device; and an imaging controller that synchronizes an exposure timing of the first imaging device and an exposure timing of the second imaging device on the basis of the imaging conditions.

In the imaging control apparatus, the imaging control method, or the imaging apparatus according to the embodiment of the present disclosure, synchronization control is appropriately performed on the exposure timing of the first imaging device that performs exposure by the rolling shutter system and the exposure timing of the second imaging device that performs exposure by the rolling shutter system with the imaging conditions different from the imaging conditions of the first imaging device, on the basis of the imaging conditions.

According to the imaging control apparatus, the imaging control method, or the imaging apparatus according to the embodiment of the present disclosure, synchronization control is appropriately performed on the exposure timing of the first imaging device and the exposure timing of the second imaging device on the basis of the imaging conditions, which makes it possible for a plurality of imaging devices to perform imaging on a same object at a substantially same exposure timing.

It is to be noted that effects described here are not necessarily limited and may include any of effects described in the present disclosure.

BRIEF DESCRIPTION OF THE DRAWINGS

FIG. 1 is a configuration diagram illustrating a first schematic configuration of an imaging apparatus according to a first embodiment of the present disclosure.

FIG. 2 is a configuration diagram illustrating a second schematic configuration of the imaging apparatus according to the first embodiment.

FIG. 3 is a block diagram illustrating an example of a functional block of the imaging apparatus according to the first embodiment.

FIG. 4 is an explanatory diagram illustrating a pixel array of imaging elements.

FIG. 5 is an explanatory diagram illustrating an example of a concept of signal processing by a synthesis processor in FIG. 3.

FIG. 6 is a block diagram illustrating an example of a functional block of the synthesis processor in FIG. 3.

FIG. 7 is a flow chart illustrating an example of a signal processing procedure by the synthesis processor in FIG. 6.

FIG. 8 is an explanatory diagram illustrating an example of pixel interpolation.

FIG. 9 is an explanatory diagram illustrating an example of an interpolation filter in a case where a center pixel is a G pixel.

FIG. 10 is an explanatory diagram illustrating an example of the interpolation filter in a case where the center pixel is an R pixel or a B pixel.

FIG. 11 is an explanatory diagram illustrating an example of correlation processing by a correlation processor in FIG. 6.

FIG. 12 is an explanatory diagram illustrating an example of the correlation processing by the correlation processor in FIG. 6.

FIG. 13 is an explanatory diagram illustrating an example of exposure timings in a case where first and second imaging devices perform imaging at a mutually same angle of view and a mutually same resolution (pixel number) by a rolling shutter system.

FIG. 14 is a timing chart illustrating an example of the exposure timings in the case where the first and second imaging devices perform imaging at the mutually same angle of view and the mutually same resolution (pixel number) by the rolling shutter system.

FIG. 15 is an explanatory diagram illustrating an example of the exposure timings in a case where the first and second imaging devices perform imaging at mutually different angles of view and a mutually same resolution (pixel number) by the rolling shutter system.

FIG. 16 is a timing chart illustrating an example of the exposure timings in the case where the first and second imaging devices perform imaging at the mutually different angles of view and the mutually same resolution (pixel number) by the rolling shutter system.

FIG. 17 is an explanatory diagram illustrating an example of the exposure timings in the case where the first and second imaging devices perform imaging at the mutually different angles of view and the mutually same resolution (pixel number) by the rolling shutter system.

FIG. 18 is a timing illustrating an example in which the exposure timings in FIG. 16 are optimized on the basis of a difference in the angle of view.

FIG. 19 is a diagram illustrating an example of the exposure timings in a case where the first and second imaging devices perform imaging at a mutually same angle of view and different resolutions (pixel numbers) by the rolling shutter system.

FIG. 20 is a timing chart illustrating an example of the exposure timings in the case where the first and second imaging devices perform imaging at the mutually same angle of view and the different resolutions (pixel numbers) by the rolling shutter system.

FIG. 21 is a timing chart illustrating an example in which the exposure timings in FIG. 20 are optimized on the basis of a difference in resolution (pixel number).

FIG. 22 is a block diagram illustrating a first configuration example of a controller used to perform synchronization control on the exposure timings.

FIG. 23 is a block diagram illustrating a second configuration example of the controller used to perform synchronization control on the exposure timings.

FIG. 24 is a block diagram illustrating a third configuration example of the controller used to perform synchronization control on the exposure timings.

FIG. 25 is a block diagram illustrating a fourth configuration example of the controller used to perform synchronization control on the exposure timings.

FIG. 26 is a flow chart illustrating an example of synchronization control on the exposure timings in a case where one or both of the first and second imaging devices perform zooming.

FIG. 27 is a flow chart illustrating an example of synchronization control on the exposure timings in a case where both the first and second imaging devices perform imaging at a fixed focal point.

FIG. 28 is a configuration diagram illustrating a schematic configuration of an imaging apparatus according to a modification example of the first embodiment.

FIG. 29 is a configuration diagram illustrating a schematic configuration of an imaging apparatus according to a second embodiment.

FIG. 30 is a block diagram illustrating an example of a functional block of the imaging apparatus in FIG. 29.

FIG. 31 is a block diagram illustrating an example of a functional block of a synthesis processor in FIG. 30.

MODES FOR CARRYING OUT THE INVENTION

In the following, some embodiments of the present disclosure are described in detail with reference to the drawings. It is to be noted that description is given in the following order.

1. First Embodiment (an imaging apparatus that generates two pieces of image data having different angles of view from each other by two imaging devices and synthesizes the two pieces of image data)
 1.1 Outline of Imaging Apparatus (FIGS. 1 to 5)
 1.2 Detailed Description of Synthesis Processor (FIGS. 5 to 12)
 1.3 Description of Synchronization Control between Two Imaging Devices (FIGS. 13 to 27)
 1.4 Effects
 1.5 Modification Example of First Embodiment (FIG. 28)
2. Second Embodiment (an imaging apparatus that generates three pieces of image data having different angles of view from one another by three imaging devices and synthesizes the three pieces of image data) (FIGS. 29 to 31)
3. Other Embodiments 1. First Embodiment 1.1 Outline of Imaging Apparatus FIGS. 1 and 2 illustrate an example of a schematic configuration of an imaging apparatus according to a first embodiment of the present disclosure.

The imaging apparatus 1 according to the present embodiment is allowed to acquire an image having a wide angle of view and a high resolution with use of two imaging devices including a first imaging device 10 and a second imaging device 20.

For example, the first imaging device 10 and the second imaging device 20 are disposed so as to be horizontal to each other in physical arrangement. For example, an optical axis AX1 of the first imaging device 10 and an optical axis AX2 of the second imaging device 20 may be parallel to each other, as illustrated in FIG. 1. Alternatively, for example, the optical axis AX1 and the optical axis AX2 may not be parallel to each other, as illustrated in FIG. 2. In a case where the optical axis AX1 and the optical axis AX2 are not parallel to each other, the optical axis AX1 and the optical axis AX2 are preferably directed in a direction in which a gap between the optical axis AX1 and the optical axis AX2 is decreased with increasing distance from the imaging apparatus 1.

The first imaging device 10 and the second imaging device 20 are allowed to perform imaging on a same object so as to have different imaging regions from each other. For example, the second imaging device 20 is allowed to have, as an imaging region R2, a region excluding an outer edge of an imaging region R1 of the first imaging device 10, as illustrated in FIGS. 1 and 2. This makes it possible for the first and second imaging devices 10 and 20 to respectively generate, as image data (imaging data), first and second RAW data Iraw1 and Iraw2 that are different in angle of view from each other, for example, as illustrated in FIGS. 1 and 2. The imaging device 10 generates, for example, the first RAW data Iraw1 having a relatively wide angle of view, through imaging. The imaging device 20 generates, for example, the RAW data Iraw2 having an angle of view narrower than the angle of view of the RAW data Iraw1, through imaging. Specific examples of the first and second RAW data Iraw1 and Iraw2 are described in detail later.

FIG. 3 illustrates an example of a functional block of the imaging apparatus 1. The imaging apparatus 1 includes, for example, the first and second imaging devices 10 and 20, a signal processor 30, and a controller 40. The controller 40 controls the first and second imaging devices 10 and 20 and the signal processor 30.

(First Imaging Device 10)

The first imaging device 10 includes, for example, a first imaging element 11 and a first optical lens 12. The first optical lens 12 condenses first object light L1 and causes the condensed first object light L1 to enter a light entrance surface of the first imaging element 11. For example, the first optical lens 12 is fixed in the first imaging device 10. At this time, a focal length of the first imaging device 10 is fixed at a constant value. The first imaging device 10 may further include, for example, an iris and a variable optical LPF (lowpass filter) on the light entrance surface side of the first imaging element 11. A configuration of the first imaging element 11 is described later.

(Second Imaging Device 20)

The second imaging device 20 includes, for example, a second imaging element 21 and a second optical lens 22. The second optical lens 22 condenses second object light L2 and causes the condensed second object light L2 to enter a light entrance surface of the second imaging element 21. For example, the second optical lens 22 is fixed in the second imaging device 20. At this time, a focal length of the second imaging device 20 is fixed at a constant value. The second imaging device 20 may further include, for example, an iris and a variable optical LPF on the light entrance surface side of the second imaging element 21.

For example, the first imaging device 10 and the second imaging device 20 are allowed to make angles of view optically different from each other by the first optical lens 12 and the second optical lens 22. For example, as illustrated in FIG. 22, etc. to be described later, using zoom lenses for both the first optical lens 12 and the second optical lens 22 allows the angles of view to be optically different from each other. Alternatively, as illustrated in FIG. 24 to be described later, using a zoom lens for one of the first optical lens 12 and the second optical lens 22 and using a single focal lens for the other of the first optical lens 12 and the second optical lens 22 may allow the angles of view to be optically different from each other. Alternatively, as illustrated in FIG. 25 to be described later, the first optical lens 12 and the second optical lens 22 may include single focal lenses (fixed focus lenses) having different angles of view from each other.

(First and Second Imaging Elements 11 and 21)

Next, description is given of the first and second imaging elements 11 and 21. The first and second imaging elements 11 and 21 each include, for example, a light receiver and a color filter array. The light receiver includes a plurality of photoelectric conversion elements that are two-dimensionally arranged at predetermined intervals. The color filter array is disposed on a light entrance surface of the light receiver. The first and second imaging elements 11 and 21 are, for example, single-plate solid-state imaging elements, and each include, for example, a single-plate CMOS (Complementary Metal-Oxide Semiconductor) image sensor. In each of the first and second imaging elements 11 and 21, the color filter array is, for example, a Bayer array including an array of three colors R (red), G (green), and B (blue), as illustrated in FIG. 4. It is to be noted that the color filter array may be, for example, an RGBW array in which W (white) is added to R, G, and B. Alternatively, the color filter array may be an array of Y (yellow), C (cyan), M (magenta), etc. It is to be noted that, in the following, a case where the color filter array is the Bayer array including the RGB array is described as an example.

For example, the first and second imaging elements 11 and 21 discretely sample, by the light receivers and the color filter arrays, the first object light L1 and the second object light L2 having entered through the first and second optical lenses 12 and 22, to generate the first RAW data Iraw1 and the second RAW data Iraw2.

The first imaging element 11 generates, for example, the first RAW data Iraw1 having a relatively wide angle of view. In the first imaging device 10, for example, making the focal length of the first optical lens 12 relatively small makes it possible to obtain the first RAW data Iraw1 having a relatively wide angle of view.

The second imaging element 21 generates, for example, the second RAW data Iraw2 having an angle of view narrower than the angle of view of the first RAW data Iraw1. In the second imaging device 20, for example, making the focal length of the second optical lens 22 relatively long makes it possible to obtain the second RAW data Iraw2 having a relatively narrow angle of view.

Each of the first and second RAW data Iraw1 and Iraw2 is mosaic data in which one kind of color information out of a plurality of kinds of color information included in the color filter array is set for each pixel. In the case where the color filter array is the Bayer array including the RGB array, each of the first and second RAW data Iraw1 and Iraw2 is mosaic data in which one kind of color information of red information, green information, and blue information included in the color filter array is set for each pixel. In this case, to generate color image data Icol from the first and second RAW data Iraw1 and Iraw2, demosaic processing to generate all color information for all pixels from the first and second RAW data Iraw1 and Iraw2 is necessary. In the present embodiment, the first and second RAW data Iraw1 and Iraw2 before being subjected to the demosaic processing are synthesized. Synthesis of the first and second RAW data Iraw1 and Iraw2 is described in detail later.

(Signal Processor 30)

Next, description is given of the signal processor 30. The signal processor 30 includes, for example, a synthesis processor 31 and a camera signal processor 32, as illustrated in FIG. 3. The synthesis processor 31 synthesizes the first and second RAW data Iraw1 and Iraw2 generated by the first and second imaging devices 10 and 20, thereby generating synthesized RAW data Iraw. The camera signal processor 32 performs the demosaic processing on the synthesized RAW data Iraw generated by the synthesis processor 31, thereby generating the color image data Icol. The color image data Icol includes, for example, all kinds of color information included in the color filter array for each pixel. In the case where the color filter array is the Bayer array including RGB, the color image data Icol includes, for example, the color information of RGB for each pixel.

FIG. 5 illustrates an example of a concept of the signal processing by the synthesis processor 31. In FIG. 5, priority is given to understandability of the signal processing by the synthesis processor 31; therefore, the signal processing is briefly described. Accordingly, reference numerals different from the above-described reference numerals are used in FIG. 5.

The synthesis processor 31 acquires wide image data Iwide from the first imaging device 10, and acquires telephoto image data Itele from the second imaging device 20. An angle of view of the telephoto image data Itele is smaller than that of the wide image data Iwide. The telephoto image data Itele corresponds to a predetermined region α excluding an outer edge of the wide image data Iwide. The synthesis processor 31 sets the predetermined region α on the basis of magnification of each of the first and second imaging devices 10 and 20 and an image size of each of the wide image data Iwide and the telephoto image data Itele.

The synthesis processor 31 clips the predetermined region α from the wide image data Iwide to generate image data Iwide'. The synthesis processor 31 reduces the telephoto image data Itele on the basis of the magnification of each of the first and second imaging devices 10 and 20, to generate image data Itele'. The synthesis processor 31 synthesizes the image data Iwide' and the image data Itele' with each other to generate synthesized image data Ifusion. It is assumed that the magnification of the first imaging device 10 is set to one time and the magnification of the second imaging device 20 is set to two times. At this time, for example, in a case where the magnification specified by a user is one time, the synthesis processor 31 outputs the wide image data Iwide as the synthesized RAW data Iraw. For example, in a case where the magnification specified by the user is two or more times, the synthesis processor 31 outputs, as the synthesized RAW data Iraw, the telephoto image data Itele that has been magnified by the magnification specified by the user. For example, in a case where the magnification specified by the user is from one time to two times, the synthesis processor 31 outputs, as the synthesized RAW data Iraw, synthesized image data Imerge generated by replacing the predetermined region α in the wide image data Iwide with the synthesized image data Ifusion.

It is to be noted, actually, positional deviation caused by parallax, sensitivity difference and exposure difference between the first and second imaging devices 10 and 20 may be included in the image data Iwide' and the image data Itele'. Moreover, the synthesized image data Ifusion may include a high-frequency component exceeding a Nyquist frequency of each of the first and second imaging devices 10 and 20. The image data Iwide' and the image data Itele' are mosaic data by definition; therefore, pixel interpolation is preferably performed on the image data Iwide' and the image data Itele' in order to synthesize the image data Iwide' and the image data Itele' with each other with high accuracy. Accordingly, the synthesis processor 31 preferably performs various kinds of signal processing described below on the image data Iwide' and the image data Itele'.

1.2 Detailed Description of Synthesis Processor

FIG. 6 illustrates an example of a functional block of the synthesis processor 31. FIG. 7 illustrates an example of a procedure of the signal processing by the synthesis processor 31.

The synthesis processor 31 includes a positioner 130 and a synthesizer 140. The positioner 130 generates, on the basis of the first and second RAW data Iraw1 and Iraw2 generated by the first and second imaging devices 10 and 20, positioning data of the first and second RAW data Iraw1 and Iraw2. The synthesizer 140 synthesizes the first and second RAW data Iraw1 and Iraw2 with each other on the basis of the positioning data generated by the positioner 130.

The positioner 130 includes, for example, a clipper 131, a gain corrector 132, pixel correctors 133 and 134, a reducer 135, and a parallax calculator 136.

The clipper 131 specifies, in the first RAW data Iraw1, a fusion region β (corresponding to the region α in FIG. 5) to be synthesized with the second RAW data Iraw2. Specifically, the clipper 131 specifies the fusion region β on the basis of the magnification of each of the first and second imaging devices 10 and 20 and the image size of each of the first and second RAW data Iraw1 and Iraw2. The clipper 131 specifies coordinates of the fusion region β in the first RAW data Iraw1 on the basis of, for example, the magnification of each of the first and second imaging devices 10 and 20 and the image size of each of the first and second RAW data Iraw1 and Iraw2. The clipper 131 clips RAW data Iraw1a corresponding to the fusion region β from the first RAW data Iraw1 on the basis of, for example, the specified coordinates (step S101).

It is to be noted the synthesis processor 31 may perform OPB (Optical Black) subtraction on the RAW data Iraw1a and the second RAW data Iraw2. The OPB subtraction indicates elimination of a noise component caused by a dark current, etc. For example, the synthesis processor 31 may eliminate, from the RAW data Iraw1a and the second RAW data Iraw2, a noise component generated in a case where the first and second imaging devices 10 and 20 are shielded from light. At this time, in a case where there is a pixel having a value that becomes negative due to elimination of the noise component in the RAW data Iraw1a and the second RAW data Iraw2, the synthesis processor 31 holds coordinates of the pixel.

The gain corrector 132 calculates a gain ratio (e.g., RGB gain ratio) for each color information in the RAW data Iraw1a and the second RAW data Iraw2. For example, the gain corrector 132 calculates an average value in the RAW data Iraw1a for each color information and calculates an average value in the second RAW data Iraw2 for each color information. For example, the gain corrector 132 calculates a correction gain for each color information from a ratio of the average values of the RAW data Iraw1a and Iraw2 for each color information. The gain corrector 132 corrects the second RAW data Iraw2 on the basis of the calculated correction gain (step S102), thereby generating RAW data Iraw2a.

The pixel corrector 133 performs interpolation of all of the pixels included in the RAW data Iraw1a on the basis of a predetermined kind of color information (e.g., green information) included in the RAW data Iraw1a, to generate, as the positioning data, interpolated RAW data Iraw1b including the predetermined kind of color information (e.g., green information) (step S103). The pixel corrector 134 performs interpolation of all of the pixels included in the RAW data Iraw2a on the basis of the predetermined kind of color information (e.g., green information) included in the RAW data Iraw2a, to generate, as the positioning data, interpolated RAW data Iraw2b including the predetermined kind of color information (e.g., green information).

The pixel corrector 133 generates the interpolated RAW data Iraw1b including the green information, from the RAW data Iraw1a including the Bayer array of the RGB array, for example, as illustrated in FIG. 8. Further, the pixel corrector 133 generates the interpolated RAW data Iraw2b including the green information, from the RAW data Iraw2a including the Bayer array of the RGB array, for example, as illustrated in FIG. 8. At this time, in a case where a center pixel (pixel to be interpolated) is a G pixel, the pixel corrector 133 corrects the green information of the center pixel with use of, for example, an interpolation filter F illustrated in FIG. 9. Further, in a case where the center pixel (pixel to be interpolated) is an R pixel or a B pixel, the pixel corrector 133 replaces the color information of the center pixel with the green information generated with use of, for example, the interpolation filter F illustrated in FIG. 10.

The reducer 135 reduces the interpolated RAW data Iraw2b on the basis of the magnification of each of the first and second imaging devices 10 and 20 (step S104). The parallax calculator 136 calculates parallax information Disp as the positioning data on the basis of the interpolated RAW data Iraw1b and Iraw2c (step S105). The parallax information Disp corresponds to a positional deviation amount on an image that is caused by misalignment of the position of the first imaging device 10 and the position of the second imaging device 20. The parallax calculator 136 generates the parallax information Disp from the interpolated RAW data Iraw1b and Iraw2c with use of, for example, a motion vector estimation method, etc. between two images.

The synthesizer 140 includes, for example, a fusion unit 141, a LPF (lowpass filter) unit 142, a correlation processor 143, a merging unit 144, and a selector 145.

The fusion unit 141 synthesizes two pieces of interpolated RAW data Iraw1b and Iraw2c to generate synthesized RAW data Iraw3a (step S106). Specifically, the fusion unit 141 synthesizes the two pieces of interpolated RAW data Iraw1b and Iraw2c on the basis of the parallax information Disp, to generate the synthesized RAW data Iraw3a.

The LPF unit 142 attenuates the high-frequency component exceeding the Nyquist frequency of each of the first and second imaging devices 10 and 20, included in the synthesized RAW data Iraw3a, to generate synthesized RAW data Iraw3b (step S107). As a result, occurrence of false color is suppressed.

The correlation processor 143 performs correlation processing on synthesized RAW data Iraw3b that is the synthesized RAW data Iraw3a or the synthesized RAW data Iraw3a having been subjected to the predetermined processing (step S108). For example, the correlation processor 143 adds, to the synthesized RAW data Iraw3a or the synthesized RAW data Iraw3b, a color difference component (Iraw1−Iraw1b) that is a difference between the first RAW data Iraw1 and the interpolated RAW data Iraw1b, as illustrated in FIG. 11. A color ratio may be used in the correlation processing. For example, the correlation processor 143 may multiply the synthesized RAW data Iraw3a or the synthesized RAW data Iraw3b by a color ratio component (Iraw1/Iraw1b) that is a ratio of the first RAW data Iraw1 and the interpolated RAW data Iraw1b, as illustrated in FIG. 12. As a result, the correlation processor 143 generates the RAW data Iraw3c including an array that corresponds to the array of the first and second RAW data Iraw1 and Iraw2.

The merging unit 144 synthesizes the first RAW data Iraw1 and the RAW data Iraw3c with each other to generate RAW data Iraw3d for demosaic processing (step S109). At this time, the merging unit 144 provides a frame-shaped region having color information of zero, in a peripheral edge of the RAW data Iraw3c, to make an image size of the RAW data Iraw3c equal to an image size of the first RAW data Iraw1. Subsequently, the merging unit 144 sets, for example, the color information of the fusion region α in the first RAW data Iraw1 to zero. Further, for example, the merging unit 144 adds, to the first RAW data Iraw1, the RAW data Iraw3c having an image size having been made equal to the image size of the RAW data Iraw1. In other words, for example, the merging unit 144 replaces the fusion region α in the first RAW data Iraw1 with the RAW data Iraw3c.

It is to be noted, in the case where the synthesis processor 31 performs the OPB subtraction, the merging unit 144 may add, to the RAW data Iraw3c, the noise component eliminated in the OPB subtraction in consideration of a symbol before the synthesis processing is performed.

The selector 145 selects the synthesized RAW data Iraw to be outputted, in accordance with the magnification specified by the user. It is assumed that the magnification of the first imaging device 10 is set to one time, and the magnification of the second imaging device 20 is set to two times. At this time, for example, in a case where the magnification specified by the user is one time, the selector 145 outputs the first RAW data Iraw1 as the synthesized RAW data Iraw. For example, in a case where the magnification specified by the user is two or more times, the synthesis processor 31 outputs, as the synthesized RAW data Iraw, the second RAW data Iraw2 that has been magnified by the magnification specified by the user. For example, in a case where the magnification specified by the user is from one time to two times, the synthesis processor 31 outputs the RAW data Iraw3d as the synthesized RAW data Iraw.

(Effect of Synthesis Processing in Imaging Apparatus 1)

In the imaging apparatus 1 according to the present embodiment, the region excluding the outer edge of the imaging region R1 of the first imaging device 10 corresponds to the imaging region R2 of the second imaging device 20. Further, in the imaging apparatus 1, the first RAW data Iraw1 having a relatively wide angle of view and the second RAW data Iraw2 having an angle of view narrower than that of the first RAW data Iraw1 are generated by the first and second imaging devices 10 and 20. Therefore, the predetermined region (fusion region β) excluding the outer edge of the synthesized RAW data Iraw and the second RAW data Iraw2 are synthesized with each other. In other words, the second RAW data Iraw2 is fitted into the frame-shaped first RAW data Iraw1. As a result, it is possible to obtain an image having a wide angle of view and a high resolution with use of the first and second imaging devices 10 and 20. Moreover, even in a case where both the first and second optical lenses 12 and 22 in the first and second imaging devices 10 and 20 include fixed focus lenses, it is possible to achieve optical zooming without using a mechanical zoom mechanism.

Further, in the imaging apparatus 1, interpolation of all of the pixels included in the first and second RAW data Iraw1 and Iraw2 is performed on the basis of the predetermined kind of color information included in the first and second RAW data Iraw1 and Iraw2. This makes it possible to perform synthesis processing with accuracy substantially equal to accuracy in the synthesis processing that is performed after the demosaic processing is performed on the first and second RAW data Iraw1 and Iraw2.

Further, in the imaging apparatus 1, the parallax information Disp as the positioning data is generated on the basis of the two pieces of interpolated RAW data Iraw1b and Iraw2b generated from the first and second RAW data Iraw1 and Iraw2. Therefore, using the parallax information Disp makes it possible to enhance accuracy of synthesis of the interpolated RAW data Iraw1b and the interpolated RAW data Iraw2c.

Further, in the imaging apparatus 1, the high-frequency component exceeding the Nyquist frequency of each of the first and second imaging devices 10 and 20, included in the synthesized RAW data Iraw3a is attenuated by the LPF unit 142. This makes it possible to suppress occurrence of false color in a case where the RAW data Irawa1 and the RAW data Iraw3c are synthesized with each other.

Further, in the imaging apparatus 1, the color difference component (Iraw1−Iraw1b) is added to the synthesized RAW data Iraw3c or the synthesized RAW data Iraw3a having been subjected to the predetermined processing (synthesized RAW data Iraw3b). As described above, in the imaging apparatus 1, lost color information is returned to the synthesized RAW data Iraw3c or the synthesized RAW data Iraw3b after the synthesis processing with less color information is performed. Accordingly, in the imaging apparatus 1, it is possible to enhance accuracy of synthesis while reducing processing cost and power consumption necessary for the synthesis processing.

Further, in the imaging apparatus 1, the demosaic processing is performed on the RAW data Iraw3d generated by synthesizing the first RAW data Iraw1 and the RAW data Iraw3c with each other. As described above, in the imaging apparatus 1, the demosaic processing is performed after synthesis of the RAW data is performed, thus making it possible to reduce the processing cost and the power consumption as compared with a case where the synthesis is performed after the demosaic processing is performed.

1.3 Description of Synchronization Control Between Two Imaging Devices

In a case where imaging with use of the first and second imaging devices 10 and 20 is performed as with the above-described imaging apparatus 1, it is desirable to appropriately control exposure timings in the respective imaging devices. As a typical electronic shutter system in an imaging device including an image sensor such as a CMOS, a global shutter system and a rolling shutter system are known. In the global shutter system, an electronic shutter operation is performed on all pixels simultaneously. Hence, in the global shutter system, the exposure timing is same for all pixels. In contrast, in the rolling shutter system, the electron shutter operation is performed, on, for example, each horizontal line. Hence, in the rolling shutter system, the exposure timing is shifted, for example, by one horizontal line. For this reason, in particular, in a case where exposure is performed by the rolling shutter system in the first and second imaging devices 10 and 20, it is desirable to appropriately control the exposure timings in the respective imaging devices.

It is to be noted that in the following, description is given in association with the configuration of the imaging apparatus 1 illustrated in FIGS. 1 to 3, etc. as appropriate; however, a technique of synchronization control achieved by the present disclosure is applicable to a configuration other than the configuration of the imaging apparatus 1 illustrated in FIGS. 1 to 3, etc. For example, the technique of the synchronization control achieved by the present disclosure is also applicable to a case where image data generated in the first and second imaging devices 10 and 20 are synthesized with each other by a method other than the above-described technique of image synthesis processing according to the present embodiment. Moreover, the technique of synchronization control achieved by the present disclosure is also applicable to a case where only two pieces of image data are generated without performing image synthesis. Further, in the following, synchronization control between two image devices is described as an example; however, the technique of synchronization control achieved by the present disclosure is applicable to a case where three imaging devices are used or a case where four or more imaging devices are used.
(Case where Imaging is Performed at Same Angle of View and Same Resolution (Pixel Number))

FIG. 13 and FIG. 14 illustrate an example of exposure timings in a case where the first and second imaging devices 10 and 20 perform imaging at a mutually same angle of view and a mutually same resolution (pixel number) by the rolling shutter system. Image data generated by the first imaging element 11 of the first imaging device 10 and the exposure timing are schematically illustrated on a left side of FIG. 13. Image data generated by the second imaging element 12 of the second imaging device 20 and the exposure timing are schematically illustrated on a right side of FIG. 13. FIG. 14 illustrates a timing of a synchronization signal XVS of imaging in the first and second imaging devices 10 and 20, and respective shutter timings (reset timings) and respective readout timings of pixel data in the first imaging element 11 and the second imaging element 12. FIGS. 17 to 21 to be described later also illustrate similar timings.

As illustrated in FIG. 13 and FIG. 14, in a case where the first and second imaging devices 10 and 20 perform imaging on a same object at the mutually same angle of view, imaging regions thereof are substantially the same as each other. In this case, an imaging (exposure) start position is a substantially same position p1 in the object. For this reason, synchronizing the respective shutter timings and the respective readout timings of pixel data in the first and second imaging elements 11 and 21 make it possible to perform imaging (exposure) on the same object position at a mutually same timing. Moreover, in this case, a readout period and an exposure period in the second imaging element 12 are equal to a readout period Tr1 and an exposure period Te1 in the first imaging element 11.
(Case where Imaging is Performed at Different Angles of View)

FIG. 15 and FIG. 16 illustrate an example of exposure timings in a case where the first and second imaging devices 10 and 20 perform imaging at mutually different angles of view and a mutually same resolution (pixel number) by the rolling shutter system.

As illustrated in FIG. 15 and FIG. 16, in a case where the first and second imaging devices 10 and 20 perform imaging on the same object at mutually different angles of view, the imaging regions thereof are different from each other. In the example in FIG. 15 and FIG. 16, the first imaging device 10 performs imaging at a wide angle of view that is a relatively wide angle of view, and the second imaging device 20 performs imaging at a telephoto angle of view that is a relatively narrow angle of view. In this case, the imaging region of the second imaging device 20 is relatively narrow, as compared with that of the first imaging device 10. In a case where the imaging (exposure) start position of the first imaging device 10 is a position p1 in the object, the imaging (exposure) start position of the second imaging device 20 is a position p2 located inside the position p1 in the object. Accordingly, in a case where the respective shutter timings and the respective timings of pixel data in the first and second imaging elements 11 and 21 are synchronized and the readout periods Tr1 and the exposure periods Te1 of the first and second imaging elements 11 and 21 are equal, the first imaging element 11 and the second imaging element 21 perform imaging (exposure) on the same object position at different timings. Performing imaging (exposure) on the same object position at mutually different timings in such a manner may cause a possibility that a correlation between images taken by the first and the second imaging devices 10 and 20 is not established, for example, in a case where hand movement occurs or in a case where the object moves.

FIG. 17 and FIG. 18 illustrate an example of exposure timings in a case where the first and second imaging devices 10 and 20 perform imaging at mutually different angles of view and a mutually same resolution (pixel number) by the rolling shutter system.

FIG. 18 illustrates an example in which the exposure timings in FIG. 16 are optimized on the basis of a difference in the angle of view between the first and second imaging devices 10 and 20. In a case where the first and second imaging devices 10 and 20 perform imaging at mutually different angles of view and the mutually same resolution (pixel number), it is desirable to delay the exposure start timing of the second imaging element 21 that performs imaging at a relatively narrow angle of view from the exposure start timing of the first imaging element 11 that performs imaging at a relatively wide angle of view, as illustrated in FIG. 18. Moreover, readout speed of pixel data in the second imaging element 21 that performs imaging at the narrow angle of view is desirably set to be higher than readout speed of pixel data in first imaging element 11 that performs imaging at the wide angle of view. In the example in FIG. 18, the readout start timing of the first imaging element 11 is at a time t1. The readout start timing of the second imaging element 21 is at a time t2 delayed from the time t1 in accordance with a difference in angle of view. Further, the readout period of the second imaging element 21 is a period Tr2 in which the speed is increased in accordance with the difference in the angle of view with respect to the readout period Tr1 of the first imaging element 11. Performing such timing control makes it possible for the first and second imaging devices 10 and 20 to perform imaging (exposure) on the same object position at the mutually same timing.

It is to be noted that the readout speed may be increased by binning. The binning is a technique of adding up a plurality of pixels of a same color close to one another in an analog fashion. Reducing the number of readout pixels by the binning allows for an increase in readout speed.

(Case where Imaging is Performed at Different Resolutions (Pixel Numbers))

FIG. 19 and FIG. 20 illustrate an example of exposure timings in a case where the first and second imaging devices 10 and 20 perform imaging at a mutually same angle of view and mutually different resolutions (pixel numbers) by the rolling shutter system.

As illustrated in FIG. 19 and FIG. 20, in a case where the first and second imaging devices 10 and 20 perform imaging on the same object at the mutually same angle of view and mutually different resolutions (pixel numbers), the imaging regions thereof are substantially the same as each other. In this case, in a case where respective readout speeds of pixel data in the first and second imaging elements 11 and 21 are equal to each other, a difference in pixel number results in different readout periods irrespective of the same imaging regions as each other. In the example in FIG. 20, the first imaging element 11 has a relatively large pixel number, and performs imaging at a high resolution. The second imaging element 21 has a relatively small pixel number, and performs imaging at a low resolution. In this case, the readout period of the second imaging element 21 is the period Tr2 in which speed is increased in accordance with the difference in pixel number with respect to the readout period Tr1 of the first imaging element 11. Accordingly, the first imaging element 11 and the second imaging element 21 perform imaging (exposure) on the same object position at different timings.

FIG. 21 illustrates an example in which the exposure timings in FIG. 20 are optimized on the basis of a difference in resolution (pixel number) between the first and second imaging devices 10 and 20. In a case where the first and second imaging devices 10 and 20 perform imaging on the same object at the mutually same angle of view and mutually different resolutions (pixel numbers), as illustrated in FIG. 21, the readout speed of pixel data in the second imaging element 21 having a relatively small pixel number is desirably set to be slower than the readout speed of pixel data in the first imaging element 11 having a relatively large pixel number. Conversely, the readout speed of pixel data in the first imaging element 11 having a large pixel number is desirably set to be higher than the readout speed of pixel data in the second imaging element 21 having a small pixel number. Performing such timing control makes it possible for the first and second imaging devices 10 and 20 to perform imaging (exposure) on the same object position at the mutually same timing.

(Configuration Example of Controller Used to Perform Synchronization Control on Exposure Timings)

FIG. 22 and FIG. 23 illustrate first and second configuration examples of a controller used to perform synchronization control on the exposure timings. FIG. 22 and FIG. 23 are configuration examples in a case where both the first optical lens 12 of the first imaging device 10 and the second optical lens 22 of the second imaging device 20 include a zoom lens.

The controller 40 may include an initial value storage unit 41, an imaging controller 60, and a lens controller 70, as illustrated in FIG. 22. It is to be noted that the initial value storage unit 41, the imaging controller 60, and the lens controller 70 may be provided outside the controller 40, as illustrated in FIG. 23.

The imaging controller 60 may include a readout controller 61 and a shutter controller 62. The readout controller 61 controls respective readout timings of pixel data in the first and second imaging elements 11 and 21. The shutter controller 62 controls respective shutter timings in the first and second imaging elements 11 and 21.

The lens controller 70 may include a focus controller 71 and a zoom controller 72. The focus controller 71 performs focusing control on the first and second optical lenses 12 and 22. The zoom controller 72 performs zooming control on the first and second optical lenses 12 and 22. The zoom controller 72 transmits information of the zooming magnifications of the first and second optical lenses 12 and 22 to the readout controller 61 and the shutter controller 62.

The initial value storage unit 41 holds information of initial imaging conditions in the first imaging device 10 and the second imaging device 20. The initial imaging conditions may include, for example, parameters that exert an influence on the exposure timing, such as the angle of view, the pixel number, clock speed, a frame rate, an exposure time, and an operation mode.

The imaging controller 60 synchronizes, on the basis of the imaging conditions, the exposure timing of the first imaging device 10 that performs exposure by the rolling shutter system and the exposure timing of the second imaging device 20 that performs exposure by the rolling shutter system with imaging conditions different from those of the first imaging device 10.

Herein, the imaging conditions may include one or both of the angle of view and the pixel number. The imaging conditions of the second imaging device 20 may be different in one or both of the angle of view and the pixel number from the imaging conditions of the first imaging device 10.

Moreover, the imaging conditions may include the zooming magnification of the zoom lens. The imaging controller 60 may dynamically synchronize the exposure timing of the first imaging device 10 and the exposure timing of the second imaging device 20 on the basis of the zooming magnification.

The imaging controller 60 may perform control to delay the exposure start timing of an imaging device that performs imaging at a relatively narrow angle of view of the first imaging device 10 and the second imaging device 20 from the exposure start timing of an imaging device that performs imaging at a relatively wide angle of view, as with the above-described example illustrated in FIG. 18. In this case, the imaging controller 60 may perform control to cause the readout speed of the pixel data in the imaging device that performs imaging at a narrow angle of view to be higher than the readout speed of the pixel data in the imaging device that performs imaging at a wide angle of view.

Moreover, the imaging controller 60 may perform control to cause the readout speed of the pixel data in an imaging device having a relatively large pixel number of the first imaging device 10 and the second imaging device 20 to be higher than the readout speed of the pixel data in an imaging device having a relatively small pixel number, as with the above-described example illustrated in FIG. 21.

FIG. 24 illustrates a third configuration example of the controller used to perform synchronization control on the exposure timings. In the configuration example in FIG. 24, a first optical lens 12A is provided in place of the first optical lens 12 in the configuration example in FIG. 22. The first optical lens 12A includes a fixed focus lens in place of the zoom lens. In this configuration example, the zoom controller 72 performs zooming control on the second optical lens 22. Other configurations may be substantially similar to those of the configuration example in FIG. 22.

FIG. 25 illustrates a fourth configuration example of the controller used to perform synchronization control on the exposure timings. In the configuration example in FIG. 25, the first optical lens 12A is provided in place of the first optical lens 12 in the configuration example in FIG. 22. Moreover, a second optical lens 22A is provided in place of the second optical lens 22 in the configuration example in FIG. 22. The first and second optical lenses 12A and 22A each include a fixed focus lens in place of the zoom lens.

In the configuration example in FIG. 25, a configuration including a lens controller 70A that is the lens controller 70 excluding the zoom controller 72 is adoptable. In this configuration example, the imaging controller 60 synchronizes the exposure timing of the first imaging device 10 and the exposure timing of the second imaging device 20 on the basis of the initial imaging conditions stored in the initial value storage unit 41. Other configurations may be substantially similar to those of the configuration example in FIG. 22.

FIG. 26 illustrates an example of synchronization control on the exposure timings in a case where one or both of the first and second imaging devices perform zooming (in the configuration examples in FIGS. 22 to 24).

When a power source is turned on (step S201), the imaging controller 60 reads out initial parameters from the initial value storage unit 41 (step S202). The initial parameters may be initial imaging conditions that exert an influence on the exposure timing, such as the pixel number, the clock speed, the frame rate, the exposure time, and the operation mode. The angle of view dynamically varies depending on the zooming magnification. Accordingly, the imaging controller 60 next reads out information of the zooming magnification of the zoom lens from the zoom controller 72 (step S203). Thus, the angle of view in accordance with the zooming magnification is determined. Next, the imaging controller 60 determines respective readout timings of pixel data in the first and second imaging elements 11 and 21 on the basis of the obtained imaging conditions such as the angle of view (step S204). Next, the imaging controller 60 determines respective shutter timings in the first and second imaging elements 11 and 21 on the basis of the obtained imaging conditions such as the angle of view (step S205). Next, the imaging controller 60 causes the first and second imaging elements 11 and 21 to start imaging at the determined shutter timings and the determined readout timings (step S206).

FIG. 27 illustrates an example of synchronization control on the exposure timings in a case where both the first and second imaging devices perform imaging at a fixed focal point (the configuration example in FIG. 25).

When the power source is turned on (step S201), the imaging controller 60 reads out the initial parameters from the initial value storage unit 41 (step S202A). The initial parameters may be initial imaging conditions that exert an influence on the exposure timing, such as the angle of view, the pixel number, the clock speed, the frame rate, the exposure time, and the operation mode. Next, the imaging controller 60 determines respective readout timings of pixel data in the first and second imaging elements 11 and 21 on the basis of the obtained imaging conditions such as the angle of view (step S204). Next, the imaging controller 60 determines respective shutter timings in the first and second imaging elements 11 and 21 on the basis of the obtained imaging conditions such as the angle of view (step S205). Next, the imaging controller 60 causes the first and second imaging elements 11 and 21 to start imaging at the determined shutter timings and the determined readout timings (step S206).

1.4 Effects

As described above, according to the present embodiment, synchronization control is appropriately performed on the exposure timing of the first imaging device 10 and the exposure timing of the second imaging device 20 on the basis of the imaging conditions, which makes it possible for a plurality of imaging devices to perform imaging on the same object at a substantially same exposure timing.

It is to be noted that the effects described in the description are merely illustrative and non-limiting, and other effects may be included. This applies to effects achieved by the following other embodiments.

1.5 Modification Example of First Embodiment

FIG. 28 illustrates a schematic configuration of an imaging apparatus 200 according to a modification example of the first embodiment.

In the above-described imaging apparatus 1, the camera signal processor 32 is provided subsequent to the synthesis processor 31; however, like the imaging apparatus 200, a synthesis processor 250 may be provided subsequent to first and second camera signal processors 230 and 240.

The imaging apparatus 200 includes the camera signal processor 230 and the camera signal processor 240. The camera signal processor 230 converts the first RAW data Iraw1 obtained by the first imaging device 10 into a color image Icol1, and the camera signal processor 240 converts the second RAW data Iraw2 obtained by the second imaging device 20 into a color image Icol2. The imaging apparatus 200 further includes a synthesis processor 250 that synthesizes the color images Icol1 and Icol2 obtained by the first and second camera signal processors 230 and 240, to generate a color image Icol3. As described above, in the imaging apparatus 200, color imaging (demosaic processing) is performed in each of the first and second imaging devices 210 and 220, and image synthesis is performed after the color imaging (demosaic processing) is performed.

It is to be noted that in the above-described imaging apparatus 1, the first and second RAW data Iraw1 and Iraw2 different in angle of view from each other are synthesized with each other on the basis of the positioning data generated on the basis of the first and second RAW data Iraw1 and Iraw2. In other words, in the above-described imaging apparatus 1, synthesis is performed in the state of the RAW data before being subjected to the demosaic processing. This makes it possible to reduce the number of times of the demosaic processing to once. Further, in the above-described imaging apparatus 1, the first and second RAW data Iraw1 and Iraw2 to be synthesized include less color information for each pixel than that of the color image data Icol1 and Icol2 to be synthesized in the imaging apparatus 200 of the present modification example. This makes it possible to suppress a calculation amount necessary for synthesis. Accordingly, in the above-described imaging apparatus 1, it is possible to reduce processing cost and power consumption necessary for the demosaic processing and the synthesis processing, as compared with the imaging apparatus 200 of the present modification example.

Moreover, in the above-described imaging apparatus 1, the RAW data Iraw is outputted from the synthesis processor 31. Therefore, a typical camera signal processor or the like may be used for the camera signal processor 32 subsequent to the synthesis processor 31 without adding any modification. In other words, in the above-described imaging apparatus 1, a configuration in which processing subsequent to the demosaic processing with respect to RAW output of a single imaging device is not modified at all is applicable to the camera signal processor 32. Accordingly, in the above-described imaging apparatus 1, it is possible to reduce the processing cost and the power consumption necessary for the demosaic processing and the synthesis processing with easiness similar to a case where the single imaging device is used.

2. Second Embodiment

Next, description is given of a second embodiment of the present disclosure. In the following, portions having configurations and workings that are substantially similar to those in the above-described first embodiment are not described as appropriate.

In the above-described first embodiment, the imaging apparatus 1 includes the first and second imaging devices 10 and 20; however, the imaging apparatus 1 may include three or more imaging devices. For example, the imaging apparatus 1 may include three imaging devices including the first and second imaging devices 10 and 20 and a third imaging device 50, as illustrated in FIG. 29 and FIG. 30. The first, second, and third imaging devices 10, 20, and 50 are disposed so as to be horizontal to one another in physical arrangement. For example, the optical axis AX1 of the first imaging device 10, the optical axis AX2 of the second imaging device 20, and an optical axis AX3 of the third imaging device 50 are not parallel to one another, as illustrated in FIG. 29. At this time, the optical axes AX1, AX2, and AX3 are preferably directed in a direction in which gaps of the optical axes AX1, AX2, and AX3 are mutually decreased with increasing distance from the imaging apparatus 1. The optical axes AX1, AX2, and AX3 may be parallel to one another.

In the present embodiment, the positioner 130 generates, on the basis of three or more pieces of RAW data Iraw1, Iraw2, and Iraw4 respectively generated by the first, second, and third imaging devices 10, 20, and 50, positioning data of the three or more pieces of RAW data Iraw1, Iraw2, and Iraw4. The synthesizer 140 synthesizes the three or more pieces of RAW data Iraw1, Iraw2, and Iraw4 with one another on the basis of the positioning data generated by the positioner 130.

In the present embodiment, the imaging device 20 has, as the imaging region R2, the region excluding the outer edge of the imaging region R1 of the first imaging device 10. The third imaging device 50 includes a third imaging element 51 and a third optical lens 52, and has, as an imaging region R3, a region excluding an outer edge of the imaging region R2 of the second imaging device 20. The third optical lens 52 condenses third object light L3 and causes the condensed third object light L3 to enter a light entrance surface of the third imaging element 51. The first, second, and third imaging devices 10, 20, and 50 respectively generate first, second, and third RAW data Iraw1, Iraw2, and Iraw4 that are different in angle of view from one another. The first imaging device 10 generates the first RAW data Iraw1 having a widest angle of view, through imaging. The second imaging device 20 generates the second RAW data Iraw2 having an angle of view narrower than that of the RAW data Iraw1, through imaging. The third imaging device 50 generates the third RAW data Iraw4 having an angle of view narrower than that of the RAW data Iraw2, through imaging.

In the present embodiment, the synthesis processor 31 synthesizes the predetermined region excluding the outer edge of the first RAW data Iraw1 and the RAW data Irawa2, and synthesizes the predetermined region excluding the outer edge of the RAW data Irawa2 and the third RAW data Iraw4.

FIG. 31 illustrates an example of the functional block of the synthesis processor 31 according to the present embodiment. In the present embodiment, the positioner 130 includes a signal processing block for the third RAW data Iraw4, and includes, for example, a gain corrector 137, a pixel corrector 138, and a reducer 139.

The gain corrector 137 calculates a gain ratio (e.g., RGB gain ratio) for each color information in the second and third RAW data Iraw2 and Iraw3. For example, the gain corrector 137 calculates an average value in the second RAW data Iraw2 for each color information and calculates an average value in the third RAW data Iraw4 for each color information. For example, the gain corrector 137 calculates a correction gain for each color information from a ratio of the average values of the second and third RAW data Iraw2 and Iraw4 for each color information. The gain corrector 137 corrects the RAW data Iraw4 on the basis of the calculated correction gain, thereby generating RAW data Iraw4a.

The pixel corrector 138 performs interpolation of all of the pixels included in the RAW data Iraw4a on the basis of a predetermined kind of color information (e.g., green information) included in the RAW data Iraw4a, to generate, as the positioning data, interpolated RAW data Iraw4b including the predetermined kind of color information (e.g., green information). The pixel corrector 138 performs interpolation of all of the pixels included in the RAW data Iraw4a on the basis of the predetermined kind of color information (e.g., green information) included in the RAW data Iraw4a, to generate, as the positioning data, the interpolated RAW data Iraw4b including the predetermined kind of color information (e.g., green information).

The pixel corrector 138 generates the interpolated RAW data Iraw4b including the green information, from the RAW data Iraw4a including the Bayer array of the RGB array, for example, as illustrated in FIG. 8. At this time, in a case where a center pixel (pixel to be interpolated) is a G pixel, the pixel corrector 138 corrects the green information of the center pixel with use of, for example, the interpolation filter F illustrated in FIG. 9. Further, in a case where the center pixel (pixel to be interpolated) is an R pixel or a B pixel, the pixel corrector 133 replaces the color information of the center pixel with the green information generated with use of, for example, the interpolation filter F illustrated in FIG. 10.

The reducer 139 reduces the interpolated RAW data Iraw4b on the basis of the magnification of each of the second and third imaging devices 20 and 50. The parallax calculator 136 calculates the parallax information Disp as the positioning data on the basis of the interpolated RAW data Iraw1b, Iraw2c, and Iraw4c. The parallax information Disp corresponds to a positional deviation amount on an image that is caused by misalignment of the position of the first imaging device 10 and the position of the second imaging device 20 and a positional deviation amount on an image that is caused by misalignment of the position of the second imaging device 20 and the position of the third imaging device 50. The parallax calculator 136 generates the parallax information Disp from the interpolated RAW data Iraw1b, Iraw2c, and Iraw4c with use of, for example, a motion vector estimation method, etc. between two images.

In the present embodiment, the fusion unit 141 synthesizes two pieces of interpolated RAW data Iraw1b and Iraw2c and synthesizes two pieces of interpolated RAW data Iraw2c and Iraw4c, thereby generating the synthesized RAW data Iraw3a. Specifically, the fusion unit 141 synthesizes the two pieces of interpolated RAW data Iraw1b and Iraw2c and synthesizes the two pieces of interpolated RAW data Iraw2c and Iraw4c on the basis of the parallax information Disp, thereby generating the synthesized RAW data Iraw3a.

In the present embodiment, the first and second RAW data Iraw1 and Iraw2 different in angle of view from each other are synthesized on the basis of the positioning data generated on the basis of the first and second RAW data Iraw1 and Iraw2. Further, the second and third RAW data Iraw2 and Iraw4 different in angle of view from each other are synthesized on the basis of the positioning data generated on the basis of the second and third RAW data Iraw2 and Iraw4. In other words, in the present embodiment, synthesis is performed in the state of the RAW data before being subjected to the demosaic processing. This makes it possible to reduce the number of times of the demosaic processing. Further, the first, second, and third RAW data Iraw1, Iraw2, and Iraw4 to be synthesized in the present embodiment include less color information for each pixel than that of the color image data to be synthesized in an existing technique. Accordingly, it is possible to reduce the processing cost and the power consumption necessary for the demosaic processing and the synthesis processing.

Further, in the present embodiment, the region excluding the outer edge of the imaging region R1 of the first imaging device 10 corresponds to the imaging region R2 of the second imaging device 20, and the region excluding the outer edge of the imaging region R2 of the second imaging device 20 corresponds to the imaging region R3 of the third imaging device 50. Moreover, in the present embodiment, the first RAW data Iraw1 having a relatively wide angle of view, the second RAW data Iraw2 having an angle of view narrower than that of the first RAW data Iraw1, and the third RAW data Iraw4 having an angle of view narrower than that of the second RAW data Iraw2 are generated by the first, second, and third imaging devices 10, 20, and 50. Accordingly, the predetermined region (fusion region β) excluding the outer edge of the synthesized RAW data Iraw and the second RAW data Iraw2 are synthesized with each other. Furthermore, the predetermined region excluding the outer edge of the second RAW data Iraw2 and the third RAW data Iraw4 are synthesized with each other. In other words, the second RAW data Iraw2 is fitted into the frame-shaped first RAW data Iraw1, and the third RAW data Iraw4 is fitted into the frame-shaped second RAW data Iraw2. As a result, it is possible to obtain an image having a wide angle of view and a high resolution with use of the first, second, and third imaging devices 10, 20, and 50. Moreover, even in a case where all of the first, second, and third optical lenses 12, 22, and 52 of the first, second, and third imaging devices 10, 20, and 50 include fixed focus lenses, it is possible to perform optical zooming without using a mechanical zoom mechanism.

Other configurations, operations, and effects may be substantially similar to those in the above-described first embodiment.

3. Other Embodiments

Although the technology achieved by present disclosure is not limited to description of the above-described respective embodiments, and may be modified in a variety of ways.

Various forms are conceivable as variations of a camera to which the imaging apparatus 1 etc. illustrated in FIG. 1 is applied. The first optical lens 12, etc. may be of a fixed type or an interchangeable type. In a case where the first optical lens 12 or the like is an interchangeable lens unit, the lens controller 70 and the imaging controller 60 illustrated in FIG. 22, FIG. 23, etc. may be provided on a side on which a camera body is located or on a side on which the interchangeable lens unit is located.

Moreover, in the imaging apparatus 1, etc. illustrated in FIG. 1, the color image data Icol generated by the signal processor 30 may be stored in an external memory or may be displayed on a display. Further, the color image data Icol may be transmitted to any other device through a network, in place of being stored or displayed. Furthermore, the signal processor 30 illustrated in FIG. 1 may be separated from a main body of the imaging apparatus 1. For example, the signal processor 30 may be provided at an end of a network coupled to the imaging apparatus 1. Moreover, the main body of the imaging apparatus 1 may store image data in an external memory without performing image processing, and may cause a different device such as a PC (personal computer) to perform image processing.

It is to be noted that processing by the signal processor 30 may be executed as a program by a computer. A program of the present disclosure is, for example, a program provided from, for example, a storage medium to an information processing device and a computer system that are allowed to execute various program codes. Executing such a program by the information processing device or a program execution unit in the computer system makes it possible to achieve processing corresponding to the program.

Moreover, a series of image processing by the present technology may be executed by hardware, software, or a combination thereof. In a case where processing by software is executed, it is possible to install a program holding a processing sequence in a memory in a computer that is built in dedicated hardware, and cause the computer to execute the program, or it is possible to install the program in a general-purpose computer that is able to execute various kinds of processing, and cause the general-purpose computer to execute the program. For example, it is possible to store the program in the storage medium in advance. In addition to installing the program from a storage medium to a computer, it is possible to receive the program through a network such as LAN (Local Area Network) and the Internet and install the program in a storage medium such as a built-in hard disk.

Moreover, the present technology may have the following configurations, for example.

(1)

An imaging control apparatus, including:

an imaging controller that synchronizes an exposure timing of a first imaging device that performs exposure by a rolling shutter system and an exposure timing of a second imaging device that performs exposure by a rolling shutter system with imaging conditions different from imaging conditions of the first imaging device, on the basis of the imaging conditions.

(2)

The imaging control apparatus according to (1), in which the imaging conditions include one or both of an angle of view and a pixel number, and the imaging conditions of the second imaging device differ from the imaging conditions of the first imaging device in one or both of the angle of view and the pixel number.

(3)

The imaging control apparatus according to (1) or (2), further including a storage unit that holds information of the imaging conditions in an initial state of the first imaging device and the second imaging device, in which the imaging controller synchronizes the exposure timing of the first imaging device and the exposure timing of the second imaging device on the basis of the imaging conditions in the initial state.

(4)

The imaging control apparatus according to any one of (1) to (3), in which one or both of the first imaging device and the second imaging device include a zoom lens, the imaging conditions include at least a zooming magnification of the zoom lens, and the imaging controller synchronizes the exposure timing of the first imaging device and the exposure timing of the second imaging device on the basis of the zooming magnification.

(5)

The imaging control apparatus according to any one of (1) to (4), in which the imaging conditions include at least the angle of view, and the imaging conditions include at least an angle of view, and the imaging controller delays an exposure start timing of an imaging device that performs imaging at a relatively narrow angle of view of the first imaging device and the second imaging device from an exposure start timing of an imaging device that performs imaging at a relatively wide angle of view.

(6)

The imaging control apparatus according to (5), in which the imaging controller causes readout speed of pixel data in the imaging device that performs imaging at the narrow angle of view to be higher than readout speed of pixel data in the imaging device that performs imaging at the wide angle of view.

(7)

The imaging control apparatus according to any one of (1) to (4), in which the imaging conditions include at least a pixel number, and the imaging controller causes readout speed of pixel data in an imaging device having a relatively large pixel number of the first imaging device and the second imaging device to be higher than readout speed of pixel data in an imaging device having a relatively small pixel number.

(8)

An imaging control method, including:

performing synchronization control on an exposure timing of a first imaging device that performs exposure by a rolling shutter system and an exposure timing of a second imaging device that performs exposure by the rolling shutter system with imaging conditions different from imaging conditions of the first imaging device, on the basis of the imaging conditions.

(9)

An imaging apparatus, including:

a first imaging device that performs exposure by a rolling shutter system;

a second imaging device that performs exposure by the rolling shutter system with imaging conditions different from imaging conditions of the first imaging device; and an imaging controller that synchronizes an exposure timing of the first imaging device and an exposure timing of the second imaging device on the basis of the imaging conditions.

(10)

The imaging apparatus according to (9), further including a synthesizer that synthesizes two pieces of image data having different imaging regions from each other, the two pieces of image data being generated by performing imaging at angles of view different from each other in the first imaging device and the second imaging device.

(11)

The imaging apparatus according to (10), in which the synthesizer synthesizes the two pieces of image data to include image data having a relatively narrow angle of view of the two pieces of image data in a predetermined region excluding an outer edge of image data having a relatively wide angle of view.

This application claims the benefit of Japanese Priority Patent Application No. 2016-053995 filed with the Japan Patent Office on Mar. 17, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging control apparatus, comprising:

an imaging controller that synchronizes an exposure timing of a first imaging device that performs exposure by a rolling shutter system and an exposure timing of a second imaging device that performs exposure by a rolling shutter system with imaging conditions different from imaging conditions of the first imaging device, on a basis of the imaging conditions;

wherein the image controller includes a positioner having a clipper that specifies a region to be synthesized on a basis of a magnification of the first imaging device and the second imaging device and an image size of each of a first data and a second data from the first imaging device and the second imaging device, the first data being processed by a first pixel corrector, and the second data being processed by a gain corrector, a second pixel corrector, a reducer, and a parallax calculator;

wherein the first pixel corrector performs interpolation of all of the pixels in the first data based on a predetermined kind of color information and the second pixel corrector performs interpolation of all of the pixels in the second data based on the predetermined kind of color information and wherein the first pixel corrector and the second pixel corrector process the first data and the second data in parallel.

2. The imaging control apparatus according to claim 1, wherein
the imaging conditions include one or both of an angle of view and a pixel number, and
the imaging conditions of the second imaging device differ from the imaging conditions of the first imaging device in one or both of the angle of view and the pixel number.

3. The imaging control apparatus according to claim 1, further comprising a storage unit that holds information of the imaging conditions in an initial state of the first imaging device and the second imaging device, wherein
the imaging controller synchronizes the exposure timing of the first imaging device and the exposure timing of the second imaging device on a basis of the imaging conditions in the initial state.

4. The imaging control apparatus according to claim 1, wherein
one or both of the first imaging device and the second imaging device include a zoom lens,
the imaging conditions include at least a zooming magnification of the zoom lens, and
the imaging controller synchronizes the exposure timing of the first imaging device and the exposure timing of the second imaging device on a basis of the zooming magnification.

5. The imaging control apparatus according to claim 1, wherein
the imaging conditions include at least an angle of view, and
the imaging controller delays an exposure start timing of an imaging device that performs imaging at a relatively narrow angle of view of the first imaging device and the second imaging device from an exposure start timing of an imaging device that performs imaging at a relatively wide angle of view.

6. The imaging control apparatus according to claim 5, wherein the imaging controller causes readout speed of pixel data in the imaging device that performs imaging at the narrow angle of view to be higher than readout speed of pixel data in the imaging device that performs imaging at the wide angle of view.

7. The imaging control apparatus according to claim 1, wherein
the imaging conditions include at least a pixel number, and
the imaging controller causes readout speed of pixel data in an imaging device having a relatively large pixel number of the first imaging device and the second imaging device to be higher than readout speed of pixel data in an imaging device having a relatively small pixel number.

8. An imaging control method, comprising:
performing synchronization control on an exposure timing of a first imaging device that performs exposure by a rolling shutter system and an exposure timing of a second imaging device that performs exposure by the rolling shutter system with imaging conditions different from imaging conditions of the first imaging device, on a basis of the imaging conditions wherein performing in synchronization control includes using a positioner having a clipper that specifies a region to be synthesized on a basis of a magnification of the first imaging device and the second imaging device and an image size of each of a first data and a second data from the first imaging device and the second imaging device, the first data being processed by a first pixel corrector, and the second data being processed by a gain corrector, a second pixel corrector, a reducer, and a parallax calculator;

wherein the first pixel corrector performs interpolation of all of the pixels in the first data based on a predetermined kind of color information and the second pixel corrector performs interpolation of all of the pixels in the second data based on the predetermined kind of color information and wherein the first pixel corrector and the second pixel corrector process the first data and the second data in parallel.

9. An imaging apparatus, comprising:
a first imaging device that performs exposure by a rolling shutter system;
a second imaging device that performs exposure by the rolling shutter system with imaging conditions different from imaging conditions of the first imaging device; and
an imaging controller that synchronizes an exposure timing of the first imaging device and an exposure timing of the second imaging device on a basis of the imaging conditions;
wherein the image controller includes a positioner having a clipper that specifies a region to be synthesized on a basis of a magnification of the first imaging device and the second imaging device and an image size of each of a first data and a second data from the first imaging device and the second imaging device, the first data being processed by a first pixel corrector, and the second data being processed by a gain corrector, a second pixel corrector, a reducer, and a parallax calculator;
wherein the first pixel corrector performs interpolation of all of the pixels in the first data based on a predetermined kind of color information and the second pixel corrector performs interpolation of all of the pixels in the second data based on the predetermined kind of color information and wherein the first pixel corrector and the second pixel corrector process the first data and the second data in parallel.

10. The imaging apparatus according to claim 9, further comprising a synthesizer that synthesizes two pieces of image data having different imaging regions from each other, the two pieces of image data being generated by performing imaging at angles of view different from each other in the first imaging device and the second imaging device.

11. The imaging apparatus according to claim 10, wherein the synthesizer synthesizes the two pieces of image data to include image data having a relatively narrow angle of view of the two pieces of image data in a predetermined region excluding an outer edge of image data having a relatively wide angle of view.

* * * * *